United States Patent [19]
Allan et al.

[11] Patent Number: 6,120,714
[45] Date of Patent: Sep. 19, 2000

[54] MOULDING PROCESS AND ARTICLE PRODUCED BY THE PROCESS

[75] Inventors: Peter Stewart Allan, Chalfont St. Peter; Michael John Bevis, Uxbridge, both of United Kingdom; Kazuharu Yasuda, Yokohama, Japan

[73] Assignee: Brunel University of Uxbridge, Middlesex, United Kingdom

[21] Appl. No.: 08/961,700

[22] Filed: Oct. 31, 1997

[30] Foreign Application Priority Data

Nov. 1, 1996 [GB] United Kingdom ............... 9622824

[51] Int. Cl.⁷ .................................................. B29C 31/10
[52] U.S. Cl. ..................... 264/69; 264/255; 264/328.8; 264/328.12; 264/328.16; 264/403; 425/130
[58] Field of Search ............................. 428/411.1, 910, 428/66.6; 264/255, 403, 69, 328.8, 328.12, 328.16; 425/130

[56] References Cited

U.S. PATENT DOCUMENTS

| | | | |
|---|---|---|---|
| 4,863,369 | 9/1989 | Schad et al. | 425/547 |
| 5,008,064 | 4/1991 | Sorensen | 264/308 |
| 5,262,112 | 11/1993 | Sorenson | 264/255 |
| 5,543,092 | 8/1996 | Ibar | 264/40 |

FOREIGN PATENT DOCUMENTS

| | | |
|---|---|---|
| 0191623 | 8/1986 | European Pat. Off. . |
| 58-40504 | 3/1983 | Japan . |
| 43893 | 1/1992 | Japan . |
| 1270142 | 4/1972 | United Kingdom . |
| 1339444 | 12/1973 | United Kingdom . |
| 1339445 | 12/1973 | United Kingdom . |
| 2081171 | 2/1982 | United Kingdom . |
| 2170142 | 7/1986 | United Kingdom . |
| 2299779A | 10/1996 | United Kingdom . |
| 2299780A | 10/1996 | United Kingdom . |
| WO 79/01111A1 | 12/1979 | WIPO . |

*Primary Examiner*—Paul Thibodeau
*Assistant Examiner*—D. Lawrence Tarazano
*Attorney, Agent, or Firm*—Mary R. Bonzagni, Esq.; Holland & Bonzagni, P.C.

[57] ABSTRACT

A process for forming a molded article having a multilayer structure which comprises successively injecting melts of at least two materials into the cavity portion of a mold, solidifying a part thereof in the cavity portion to form the multilayer structure, characterized in that as a first step, one of the molten materials is injected into the cavity portion and the portion of the injected molten material contacting with the mold surface is solidified to a predetermined thickness to form a skin layer; as the second step, the next molten materials is fed into the cavity, the unsolidified portion of the molten material previously fed is pushed out of the cavity and a part of the thus fed molten material is cooled and solidified from the surface of the mold to form the next layer; and the procedure of the second step is successively repeated using the remainder of the molten materials alternately, and the molded article produced by the above molding process.

15 Claims, 16 Drawing Sheets

MOULDING PROCESS AND ARTICLE PRODUCED BY THE PROCESS

FIELD OF THE INVENTION

The present invention relates to a moulding process for providing a multilayer moulded article whose fine structure has been controlled, particularly to a process for injection moulding a thermoplastic resin. The present invention is also concerned with a multi-functional, high function multilayer moulded article, particularly to an injection moulded article.

BACKGROUND OF THE INVENTION

The injection moulding of a thermoplastic resin has heretofore been directed generally to a technique characterized by moulding a resin mixture in a mould utilising the plasticity of a thermoplastic resin. The thermoplastic resin is melted, injected into a mould and then cooled and solidified in the mould under a static holding pressure to obtain a desired moulded article. Recently, a great number of thermoplastic resins have been commercialised in response to various required characteristics.

However, since a moulded article having more and various functions has been required, a single material has become unable to respond to the requirement in some cases. To solve such a problem, in the resin processing field, multilayer moulding processes utilising the characteristics of various resins such as co-extrusion in extrusion moulding, lamination moulding in film formation, multilayer blow moulding in blow moulding and the like have been developed as processes for satisfying the multifunction characteristics. Also, in the field of injection moulding, there has been used a sandwich moulding method in which two kinds of resins are plasticized in two separate cylinders and simultaneously injected into a mould through a single sprue or runner to prepare a double layer moulded article. Moreover, there has been used a two-colour moulding method in which a moulded article formed previously in a mould is placed into another mould and then a different type of a molten resin is injected thereto to form a composite article. There has also been used an insert moulding method in which a metal material, a film or the like previously prepared by a method other than injection moulding is inserted into a mould and a molten resin is filled to a cavity formed between the mould and the insert to form a composite article.

In the case of the above-mentioned multilayer extrusion moulding method, multilayer blow moulding method and multilayer film-forming method, there is a limit in the preparation of a moulded article having a complicated shape, and the moulded article is limited to flat plate, hollow article, film and the like. On the other hand, in the case of the sandwich moulding method, the productivity of the injection moulding per se is maintained; however, a sophisticated technique is required for controlling the relative thickness of a skin layer and a core layer in the preparation of a double layer moulded article by moving two kinds of resins in the same direction, and there is a great restriction in respect of the combination of materials which can be used for controlled multilayering. In general, when a sandwich moulded article having a uniform skin layer is prepared, it is necessary to adjust the fluidity of the two resins and it is difficult to prepare a multilayer moulded article from materials having extremely different fluidity. Moreover, in the case of the sandwich moulding method, a double layer moulded article can be prepared, but a moulded article having three or more layers is difficult to prepare. In the case of the insert moulding method, there is no such great restriction as in the above-mentioned sandwich moulding as to the combination of materials; however, a plurality of moulds are required and such a procedure is required that a previously prepared material must be inserted into a mould. Therefore, the insert moulding method is inferior in productivity to conventional injection moulding and conventional sandwich moulding methods. In general, the moulded article is a two-layer moulded article, and when it is intended to prepare a moulded article having three or more layers, a further mould or moulds and a further procedure or procedures corresponding to the number of layers are required for the preparation. Therefore, at present, the insert moulding method is poor in practicability.

In the case of the conventional injection moulding method, it follows that a melt of a plastic material is injected into a mould from one resin-feeding site and then a considerable packing force is applied to the single feeding site.

U.K. Patent No. 2,170,142 and Japanese Patent Application Kokoku No. 4-3,893 disclose a method which comprises applying a shearing force to the molten material charged into the mould in the course of solidification. When this technique is used, the microstructure of the interior of the moulded article can be substantially controlled, whereby it becomes possible to enhance the mechanical characteristics of the moulded article. Certainly, the use of this technique is effective for control of the micromorphology of the interior of the moulded article, and brings about, a great effect on the strengthening of the weldline and the overcoming sink marks in a thick-wall moulded article. However, in the case of the above-mentioned method, the preparation of a multilayer moulded article composed of different materials by applying a shearing force to different resins in a mould has not been carried out, and is not simple.

As regards the sandwich moulding method in which two different resins are moved in the same direction to obtain multilayer mouldings, EP-A-0191623 discloses such a technique that a filling force is periodically given to act on the molten resins to prevent sink marks and the like. However, it has been very difficult even by this method to obtain a multilayer moulded article in which each layer has a controlled thickness.

As a method of preventing a resin mixture from solidifying at too early stage, it has been proposed to elevate the temperature of a mould. However, when the temperature of a mould is elevated, such results are generally brought about with the disadvantage that long cooling times become necessary, and the product is taken out of the mould before complete solidification and a moulded article having a very poor dimension precision is obtained. Therefore, in the actual moulding, a compromise temperature between the two contradictory conditions is selected. As one effective injection moulding technique for solving these problems, Japanese Patent Application Kokoku No. 58-40,504 and U.K. Patent No. 2,081,171 proposes a method which comprises previously heating the mould surface by high-frequency induction heating.

However, according to this method, the microstructure of the interior of a moulded article has been difficult to control though the skin layer of the moulded article can be controlled.

This invention can provide a moulding process by which a multilayer moulded article whose fine structure is controlled is obtained, and also a multilayer moulded article whose fine structure is controlled.

SUMMARY OF THE INVENTION

According to this invention, there is provided a moulding process, characterized by firstly injecting the first molten material into a cavity of a mould, then injecting the second molten material into the mould while a portion of the first molten material is cooled and solidified from the mould surface, thereby, displacing the first material which still remains in a molten state in the mould; then solidifying a portion of the said material successively from the neighbourhood of the mould, thereby filling two or more kinds of molten material into the cavity portion of a mould in which the materials are formed into a product, from different feed openings with a time difference to obtain a multilayered moulded article.

Preferably, there is provided a process for preparing a moulded article having a multilayer structure composed of at least two different materials in which each of the layers is composed of one of the different materials. Melts of at least two different materials are stocked in independent reservoirs (not shown in the figures) and are successively injected into the cavity portion of a mould and partly solidified in the mould cavity to form the above-mentioned multilayer structure. As a first step, one of the molten materials is injected into the above-mentioned cavity portion from one end of the cavity (for example, 21 in FIG. 3) and the portion of the filled molten material contacting with the mould surface is solidified to a predetermined thickness to form a first layer; and as a second step, another of the molten materials is injected into the cavity portion from the other end (for example, 22 in FIG. 3) to push out the unsolidified portion of the first molten material from the cavity, and subsequently, a part of the second molten material is cooled and solidified successively from the neighbourhood of the mould; and as the subsequent steps, the same procedure as in the second step is repeated using the remainder of the molten materials in place of the second molten material until the desired multilayer structure is formed. For example, two different resins are plasticized and melted in the respective cylinders, each of the molten resins obtained is injected into a mould cavity through an independent sprue or runner. In this case, the injection conditions are set so that the two different resins to be filled into the mould cavity are connected with each other in a part of the sprue or runner. That is, the moulding is conducted so that the weldline formed on the surface of the moulded article is positioned in the sprue or runner portion which is not the product portion of the moulded article. In this case, the resin contacting with the mould is immediately cooled and solidified to form a skin layer, and this skin layer forms the first layer which is the outermost layer of the multilayer moulded article obtained finally. Subsequently, for forming the second layer, the mould cavity is filled with a further different molten resin by applying to the molten resin force sufficient for the resin to reach the product portion in the mould cavity. In this case, it is preferable to simultaneously apply a force so as to move the molten resin which was used for forming the first layer but remains unsolidified in the mould cavity, in the direction reverse to the first filling direction. At this time, the resin in the mould cavity is solidified from the region near the mould, namely the outside, to form a second layer. After the formation of the second layer, a force is applied again to the molten first resin previously moved into the reservoir formed by the resin used for forming the second layer, so that the molten first resin reaches again the product portion in the mould cavity. In this case, preferably, a force is simultaneously applied so that the resin injected into the mould cavity for forming the second layer, but remaining unsolidified, is moved in the direction reverse to the filling direction. The resin injected at this time is solidified from the region near the mould, namely from the outside, to form a third layer. In order to manifest the expected characteristics, it is also possible to prepare a desired article having more layers by repeating the above-mentioned procedure. Finally, the article thus formed is solidified to the centre and then released from the mould to obtain the desired article.

Particular potential is seen in subjecting the supplied molten material to a shear force by applying a periodic force to each of a plurality of regions of the molten material, there being a difference in the periodic forces applied to at least two different such regions effective to cause shear of the molten material at least between the two such regions.

When one of the periods of application of such forces is an integral multiple of the period of another force, it is better according to the preferable features of the process of this invention that the periodic forces applied to at least two different regions of the molten resins are allowed to act alternately (for example, out of phase with each other by 180°).

For example, in the case of using a piston for generating this periodic force, the force when the piston compresses the molten moulding material is a positive force and the force when the piston expands the molten moulding material is a negative force. According to a preferable mode of this invention, in the moulding process of this invention, a substantially larger force [about 4820 bar (70,000 p.s.i)] than used generally may be used and typically the force may be from 2750 bar to 5520 bar (from 40,000 to 80,000 p.s.i.).

The periodic force would be applied for at least the minimum time necessary to obtain the controlled cooling and the desired effect, for example, the desired multilayer structure and degree of orientation required. This depends principally on the mould cavity dimensions and nature of the mouldable composition.

Immediately prior to solidification of the molten, mouldable material, a supplementary packing force may be given to the mould cavity by applying periodic forces in phase with each other.

The other details of the shear force device for imparting a reciprocation to the molten material in the mould cavity are disclosed in U.K. Patent No. 2,170,142 and Japanese Patent Application Kokoku No. 4-3,893, and the contents thereof are incorporated herein by reference.

In the preferred embodiment, the effective control of the mould temperature is important for moulding an article having a multilayer structure. In the preparation of a desired multilayer moulded article, for example, when two kinds of resins are used and each of them is reciprocated in the mould cavity, it is necessary to solidify the first and second molten resins successively from the neighbourhood of the mould. When a thermoplastic resin is contained in the molten material, it is preferable that the mould surface temperature is not higher than the heat distortion temperature of the resin when the second layer and subsequent layers are formed, and the mould surface temperature is more preferably not more than ½, most preferably not more than ¼, of the heat distortion temperature, which is indicated in degrees Centigrade, of the thermoplastic resin.

As explained above, it is preferable that the mould temperature is low in order to cool and solidify the molten material for forming the second layer and subsequent layers of an article; however, such problems are caused that it becomes difficult to fluidize the molten material again by a gate seal or the like and the skin layer which is the outermost layer becomes too thick, in relation to the desired thickness, to obtain an article having a multilayer structure of the desired number of layers (said article is referred to hereinafter as the multilayer moulded article or multilayer mouldings in some cases). For solving these problems, it is desirable that in the formation of the skin layer, namely, the first layer, the mould temperature becomes high and in the formation of the second layer and subsequent layers, the mould temperature is quenched. Since the mould is made of a material having a very high thermal conductivity, the skin layer is immediately solidified even when the mould temperature is relatively high. For example, when an amorphous resin is used, the skin layer is immediately solidified at a temperature not higher than the heat distortion temperature or glass transition temperature of the resin. When the skin layer is formed of a resin, said layer serves as a thermal insulation material, so that in order to effectively form the second layer and subsequent layers, it is necessary to sufficiently reduce the mould temperature. Therefore, in order to cool the mould, there may be used chiller water for which a chiller is used.

As a preferable example of rapidly heating the mould, the internal surface of the mould is heated to a lower temperature than by the method using high-frequency induction heating disclosed in U.K. Patent No. 2,081,171. Speaking more specifically, it is preferable to heat the internal surface of a mould to a temperature at which the first molten material can be solidified when it is injected into the mould. For example, when the material is a thermoplastic resin, it is preferable to heat the internal surface of the mould to a temperature lower than the heat distortion temperature of the resin. By adopting said temperature, the wall thickness of the first layer which is the outermost layer of the multilayer moulded article can be controlled, and an article having the desired structure can be obtained. Moreover, by making as thin as possible the outer-most layer, which becomes a thermal insulation material when the second layer and subsequent layers are formed by cooling and solidifying, it is possible to prepare an article that exhibits more layers than the multilayer moulded article which can be prepared at a constant mould temperature.

It is desirable that the rapidly heated mould is gradually cooled immediately after the injection of the first molten material thereinto, and hence, it is better to selectively heat only the mould surface. Also, in order to control the wall thickness of the layer in the desired position of the multi-layered moulded article prepared, the specific portion of the mould may be selectively and rapidly heated. That is to say, when it is desired to make thin the specific portion of the outermost layer, this portion may have previously been selectively heated.

Such instantaneous heating may be achieved by use of infrared radiation heating, introduction of a high temperature fluid in a mould, electrical resistance heating, a laser beam or the like. However, the most suitable instantaneous heating can be effected by use of a special heating method of high-frequency induction heating. In the preferred embodiment, the temperature in the skin layer of the mould inner surface is elevated at a fast rate. The actual rate of heat elevation is determined by taking into account of the actual heat processing temperature of the resin employed, the dimensions of the moulded product, and the mould release temperature. It is recommended, however, to heat to a predetermined temperature at a heat elevation rate of 80° C. per minute or more, preferably 480° C./min. or higher and most preferably at 1200° C./min. By employing such instantaneous heating, it becomes possible to rapidly heat the mould surface without having to heat the entire mould, and reduce heat-conduction to the interior of the mould, providing for more efficient subsequent cooling of the mould.

Furthermore, by employing high-frequency induction heating, it is possible to eliminate possible contamination of the metal mould by the heating fluid mentioned. Other advantages of using the high-frequency induction heating method are stated in U.K. Patent, No. 2,081,171 and Japanese Patent Application Kokoku No. 58-40,504.

In the formation of the second layer and subsequent layers, the control of the resin-flow rate is important in addition to the above-mentioned control of the mould temperature.

According to the method disclosed in U.K. Patent No. 1,270,142, in general, such periodic forces as to always cause a shearing force are applied alternately or simultaneously to the resins to fluidize the resins in a mould cavity; however, in the preferred process, in order to ensure solidification of a resin and the like from the outside, it is preferable to substantially and temporarily stop the flow of the molten material, so that each of the molten temporary materials definitely forms a solidified layer within the mould while each molten resin is substantially allowed to flow.

The time required for the retention of the molten material within a cavity to form the respective layers of the multilayer moulded article is variable and depends upon the mould temperature, the force to be applied to the molten resin for reciprocating the resin and the like, and hence, cannot be uniquely determined. However, it is better to retain the molten resins for longer times as they are essential for the formation of internal layers. In the formation of the second layer and subsequent layers, the substantial retention time of the resin is preferably at least 1/10 of, more preferably at least ½ of and most preferably at least the same as, the time required for moving the molten resin. That is to say, when the molten resin is moved in, for example, 1 second for forming the second layer, the resin is preferably retained in the cavity as it is for at least 0.1 second, more preferable at least 0.5 second and most preferable, at least 1 second to solidify the resin forming the second layer from the region near the mould, namely from the outside.

When a continuous periodic force is simply applied to the molten material in a mould cavity, the orientation properties of the material are very effectively controlled; however, it is more difficult to prepare a multilayer moulded article. The first layer which is the outermost layer is solidified instantaneously upon contacting with the mould composed of a metal material having an excellent heat conductivity, and hence, the possibility of the formation of a double layer moulded article is high, but in the case of the formation of subsequent layers, the resin of the first layer serves as a thermal insulation material and hence when the second molten material is injected into the mould, it cannot be solidified instantaneously as compared with the first layer, so that the two kinds of materials become mixed irregularly or the two resins are not readily solidified owing to the heat generated by shearing and, in some cases, such a phenomenon takes place that the two molten materials are merely repeatedly reciprocated.

That is to say, the above-mentioned mould temperature and the force to be applied to the molten resin must be controlled. The detailed conditions therefore are varied depending upon the kind of resin used, the shape of mould and the desired multilayer structure, and hence, cannot be simply determined. However, by a simple trial according to the principles disclosed herein, the desired moulded article can be easily prepared.

The preferred process is excellent in productivity and economy because molten materials of at least two different resins are used; such that each of the molten materials is moved back in a direction opposite the feed direction after it has been injected into the mould cavity, said measure having never been previously considered, is used; and moreover, the molten materials which have been returned to their feed positions are used again in the course of multi-layering a moulded article during the moulding or can be utilised in a moulded article in the subsequent shot.

The thermoplastic resin preferably used includes all resins which are generally referred to called as thermoplastic resins, for example, polystyrene; rubber-reinforced styrene resins such as high impact polystyrene, medium impact polystyrene and the like; styrene resins such as styrene-acrylonitrile copolymer (SAN resin), acrylonitrile-butyl acrylate rubber-styrene copolymer (AAS resin), acrylonitrile-ethylene-propylene rubber-styrene copolymer (AES), acrylonitrile-chlorinated polyethylene-styrene copolymer (ACS), ABS resin (for example, acrylonitrile-butadiene-styrene copolymer, acrylonitrile-butadiene-styrene-alpha-methylstyrene copolymer, acrylonitrile-methyl methacrylate-butadiene copolymer) and the like; acrylic resins such as polymethyl methacrylate (PMMA) and the like; olefin resins such as low density polyethylene (LDPE), high density polyethylene (HDPE). polypropylene (PP) and the like; vinyl chloride resins such as polyvinyl chloride, polyvinylidene chloride, ethylene-vinyl chloride-vinyl acetate copolymer, ethylene-vinyl chloride copolymer and the like; polyester resins such as polyethylene terephthalate (PETP, PET), polybutylene terephthalate (PBTP, PBT) and the like; polycarbonate resins such as polycarbonate (PC), modified polycarbonate and the like; polyamide resins such as polyamide 66, polyamide 6, polymide 46 and the like; polyacetal (POM) resins such as polyoxymethylene copolymer, polyoxymethylene homopolymer and the like; other engineering resins and polyoxymethylene copolymer, polyoxymethylene homopolymer and the like; other engineering resins and super engineering resins such as polyether sulfone (PES), polyether imide (PEI), thermoplastic polymide (TPI), polyetherketone (PEK), polyetheretherketone (PEEK), polyphenylene sulfide (PSU) and the like; cellulose derivatives such as cellulose acetate (CA), cellulose acetate butyrate (CAB), ethyl cellulose (EC) and the like; liquid crystalline polymers such as liquid crystalline polymer, liquid crystalline aromatic polyester and the like; thermoplastic elastomers such as polyurethane elastomer (TPU), thermoplastic styrene butadiene elastomer (SBC), thermoplastic polyolefin elastomer (TPO), thermoplastic polyester elastomer (TPEE), thermoplastic vinyl chloride elastomer (TPVC), thermoplastic polyamide elastomer (TPA-E) and the like; etc.

In the preferred embodiment, the above-mentioned thermoplastic resin may be synthesised in the moulding process and then used. It is also possible to use at least two thermoplastic resins, reciprocate them before the molten resins are solidified to form a blend and mould the blend into a multilayer moulded article. The thermoplastic resin may contain fillers and/or additives and/or foaming agents, for example, a colouring agent, a flame retardant, an antistatic agent and the like, etc.

The filler added to the thermoplastic resin composition and/or moulding material includes inorganic materials, for example, glass fibre, glass bead, calcium carbonate, mica, asbestos, metal and the like.

The preferred thermosetting resin includes all those which are generally called as thermosetting resins and cured with sufficient heat, for example, phenol resin (PF), urea resin (UF), melamine resin (MF), unsaturated polyester (UP), epoxy resin (EP), diallyl phthalate resin (DAP), silicone (SI), polyurethane (PUR), polyimide (PI) and the like. The thermosetting resin may contain a filler and/or an additive and the like. The thermosetting resin may further contain a catalyst, a curing agent and the like.

A material containing a metal material and low melting point metal may be used as a molten materials.

The metal material which can be used may be one which is generally used as a filler in a moulding material and includes metals in the form of a simple substance such as iron, stainless, steel, copper, zinc, aluminum and the like; alloys thereof in the form of a powder, hollow, flake and fibre; and oxides and hydroxides of these materials.

The low melting point metal which is used as the molten material is preferably a metal having a melting point of 70 to 420° C., preferably 70 to 230° C., and includes, for example, metals such as tin, zinc, bismuth, lead, cadmium, antimony, indium and the like; alloys thereof; etc. These alloys may contain other metals such as aluminum, copper, iron, nickel and the like in such an amount that the melting points of the alloys do not exceed 420° C.

The preferred material may contain an additive for enhancing or imparting the compatibility and adhesiveness of each of the layers of the multilayer moulded article or the material per se may be modified for the same purpose. Also, a binder or the like may be inserted between the respective layers.

A multilayer moulded article formed, for example, a double layer moulded article can be used in the preparation of a hollow article by removing the core portion from the double layer moulded article. The method of removing the core portion may, when a low melting point metal is used in the moulded article, be a method comprising melting the metal and removing the same. When a water-soluble resin, for example, polyvinyl alcohol is used as the material for the core portion, this resin is dissolved in water to remove the same. When a material soluble in a specific solvent is used as the material for the core portion, the material may be removed by dissolving the same in the solvent. Furthermore, when a material incompatible with the outermost layer is used as the material for the core incompatible portion, the core portion may be mechanically drawn out. It is preferable that as the material incompatible with the outermost layer, an elastomer is used to prepare a hollow moulded article having a curved shape. In addition, it is also preferable to introduce a high pressure gas into the core material portion or between the outermost layer and the core material after or simultaneously with the preparation of the multilayer moulded article, thereby preparing a hollow part. As this hollow part, if necessary, a hollow moulded article composed of only the outermost layer may be prepared by drawing out all the materials composing the core portion.

It is possible to prepare, even if the shape is complicated, a hollow moulded article having the desired wall thickness and/or a smooth inner surface at a low cost. It is also possible to allow a fluid to flow smoothly in the hollow portion obtained and hence the hollow moulded article can be used in automobile parts such as a manifold and the like, etc.

Preferably, there is provided a ring-shaped, mulitlayer moulded article composed of at least two kinds of materials, characterized in that the orientation properties of the adjacent materials are different from each other. In the preferred multilayer moulded article, since the moving directions of adjacent layers are different, the orientation properties of the adjacent layers are also different, and can provide a moulded article excellent particularly in impact strength and the like.

Also, each layer may be formed using materials greatly different in flow properties, whereby a moulded article in which each layer has a uniform wall thickness obtained as compared with a sandwich moulded article obtained by a conventional method. Furthermore, it is possible to prepare a moulded article whose outermost layer is so thin or thick as to have been unable to be obtained by the conventional technique.

In the preferred multilayer moulded article, each layer has a ring shaped structure having the desired wall thickness in the cross-sectional shape though the ring shape may be partially cut.

Preferably, there is provided a multilayer moulded article exhibiting less sink marks and less warpage even when the moulded article is a thick walled article.

A moulded article having electromagnetic wave shield characteristics may be prepared by use of a metal layer or a material containing a metal material in an intermediate layer of a multilayer moulded article. In general, a moulded article in which a thermoplastic resin containing an electroconductive material is used causes a problem in surface appearance or such an economical problem that the material cost is high; however, in the preferred moulded article, for example, in a three-layer moulded article having a ring shape, by providing an intermediate layer of a metal or electroconductive resin having electromagnetic wave shield characteristics, the appearance of the moulded article becomes excellent owing to the skin layer and the amount of the electroconductive material used can be made relatively small by using the electroconductive material in only the intermediate layer. Such an economical effect can be expected.

The multilayer moulded article can be prepared in the form of a layer-shaped structure having any number of layers depending upon the characteristics, shape of moulded article and the like aimed at in the present invention; however, in view of the productivity and ease of implementation, the number of layers is preferably 2 to 30, more preferably 3 to 10.

BRIEF DESCRIPTION OF THE DRAWINGS

An embodiment of the present invention is described below, by way of example only, with reference to the accompanying drawings, in which.

DETAILED DESCRIPTION OF THE INVENTION

FIGS. 1A to 1D are conceptual illustrations of the preferred moulding process and FIGS. 2A to 2D are schematic diagrams of the cross-sections of the moulded articles in the stages of FIGS 1A to 1D. In FIGS 1A to 1D, the cross-sections of moulds during moulding are schematically shown.

Figure 1A:
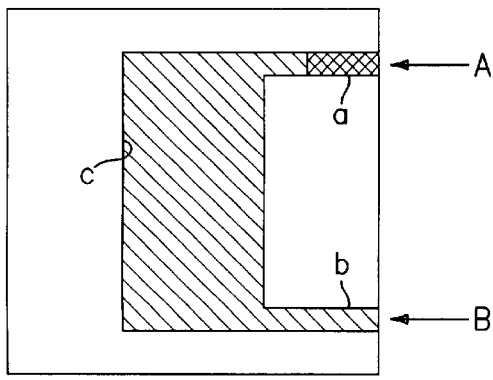
FIGS. 1A to 1D are conceptual illustrations of the preferred moulding process.

In Stage 1 of FIG. 1A, the different molten materials A and B are filled into the mould cavity from separate feed openings through separate sprues or runners. In this case, A and B may be connected in the sprues or runner which does not comprise a part of the final product moulded article, whereby, the weldline is formed there. The filling rates or the fill-starting times of the molten materials A and B are adjusted so that A and B are connected in the position a in FIGS. 1A. At this time, as shown in Stage 1 of FIG. 2A, only the molten material B is injected into the mould cavity shown by c in FIG. 1A in which the product portion of a moulded article is formed, and solidification proceeds from the outside in which the molten material contacts with the mould.

Subsequently, as shown in Stage 2 of FIG. 1B, such a force is applied that the molten material A is injected into the mould cavity, and timed so that the molten material B injected into the mould cavity is solidified to the desired wall thickness from the mould surface. In injecting the molten material A into the mould cavity, the unsolidified molten material B placed in the mould cavity in Stage 1 is pushed back into the B reservoir.

At this time, a force is preferably applied to the molten material B so that B is easily pushed back. In other words, a force of a phase difference of 180° to the force applied to the molten material A is applied to B. The former force is applied so that the molten material A reaches the runner or sprue (b in FIG. 1B) in the mould for feeding the molten material B. The forces applied to the molten materials A and B may be controlled by pressure or position. In the case of pressure-control, when the moulded article has a general, simple shape, the higher the pressure, the faster the molten material B in the mould is pushed back, so that a moulded article having the outermost layer B more uniform in wall thickness is obtained. It is preferable that when the molten material A reaches the desired position, the force applied is suspended so that the flow of molten materials A and B is halted temporarily, or such a force that the flow of the molten materials is substantially halted, for example, such a low pressure is applied to any one or both of A and B, that the molten material in the mould cavity does not move, or a force so balanced that the molten materials in the mould cavity does not move. At this time, there is formed a multilayer moulded article whose cross-section is such a double layer structure as shown in Stage 2 of FIG. 2B. By cooling the moulded article in this state to its interior to solidify the same, a double layer moulded article is obtained.

Subsequently, as shown in Stage 3 of FIG. 1C, such a force is applied that the molten material B is injected into the mould cavity and timed so that the molten material A injected into the mould cavity solidifies to the desired wall thickness from the outside. The unsolidified molten material A injected into the mould cavity in Stage 2 of 1B is pushed back to the feed side of the molten material A in Stage 2 of FIG. 1B. At this time, a force is preferably applied to the molten material A so that A is easily pushed back. In other words, a force of a phase difference of 180° to the force applied to the molten material B is applied.

Figure 1B:
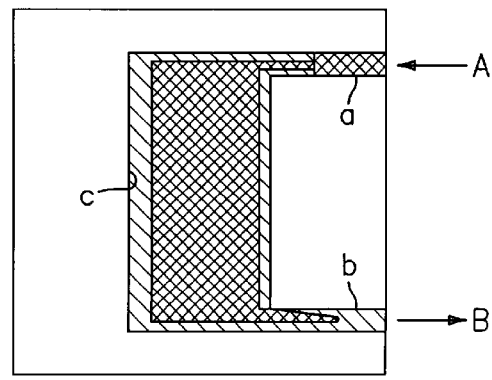
Figure 1C:
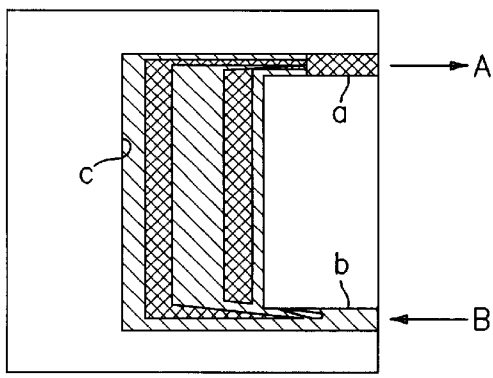
Figure 2A:
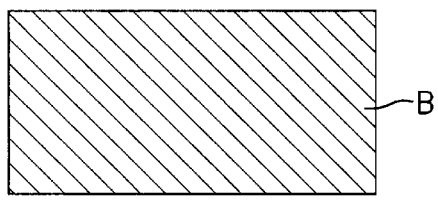
FIGS. 2A to 2D are schematic diagrams of the cross-sections of moulded articles in the stages of the moulding process shown in FIGS. 1A to 1D.
Figure 2B:
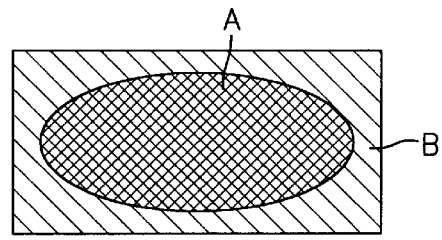
Figure 2C:
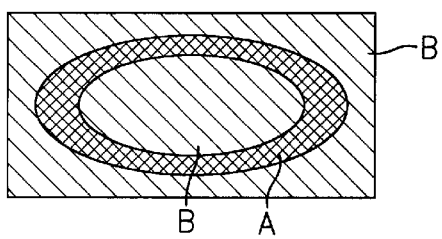

The former force is applied so that the molten material B reaches the runner or sprue (a in FIG. 1B). In Stage 3, too, it is preferable to temporarily stop the flow of the molten material before it is moved to the subsequent stage so that the molten material B injected into the mould cavity solidifies to form a third layer of the material B. At this time, a multilayer moulded article whose cross section is the three-layer structure shown in Stage 3 of FIG. 2C is formed.

Figure 1D:
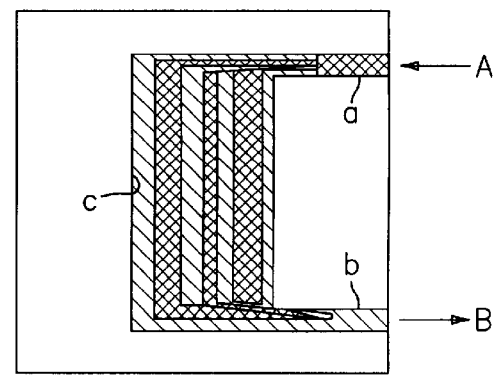
Figure 2D:
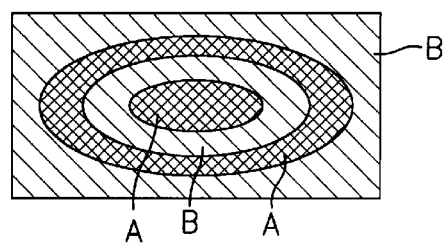

Moreover, as shown in Stage 4 of FIG. 1D, such a force is applied that the molten material A is injected into the mould cavity and timed so that the molten material B injected into the mould cavity solidifies to the desired wall thickness from the outside. The unsolidified molten material B placed in the mould cavity in Stage 3 of FIG. 1C is pushed back to the feed side of the molten material B in Stage 3 of FIG. 1C. At this time, it is preferable that a force is applied to the molten material B so that B is easily pushed back. In other words, a force of a phase difference of 180° to the force applied to the molten material A is applied to the molten material B. The former force is applied so that the molten material A reaches the runner or sprue (b in FIG. 1C). In Stage 4 of FIG. 1D, too, it is preferable to temporarily halt the flow of the molten material A before it is moved to the subsequent Stage, so that the molten material A injected into the mould cavity solidifies to form a fourth layer of the material A. At this time, a multilayer moulded article whose cross section is a four-layer structure shown in Stage 4 of FIG. 2D is obtained.

In the same manner, a multilayer moulded article having the desired number of layers can be obtained. When the finally injected molten material is solidified as the interior layer, an appropriate packing force may, be applied to the molten materials A and B.

After the moulded article is taken out, the sprue a and the runner b are removed to obtain a finished article. In the case of the product prepared by the method shown in Stages 1 to 4 of FIGS. 1A to 1D, the connected portions of the molten materials A and B are all present in the sprue and runner and hence a product having the same number of layers in other portions than the gate portion is obtained, and simultaneously there is obtained such an advantage in productivity that even if the positions of the connected portions are slightly varied, the qualities of the product portions are not so greatly different from one another are obtained. In addition, depending upon the desired characteristics and functions, the two materials may be connected in the product portion of the mould; however, it is not desirable to continue the filling operation until the molten materials reach the outside of the mould. The reason therefore is that by positioning the connecting point of the two materials in the mould cavity, in the case of preparing the next moulded article, it is possible to feed only the molten material A from the feed opening on the material A side and feed only,- the molten material B from the feed opening on the material B side. This serves to prevent a plurality of materials from being irregularly mixed in the mould and to prepare moulded articles whose qualities are stable.

Figure 3:
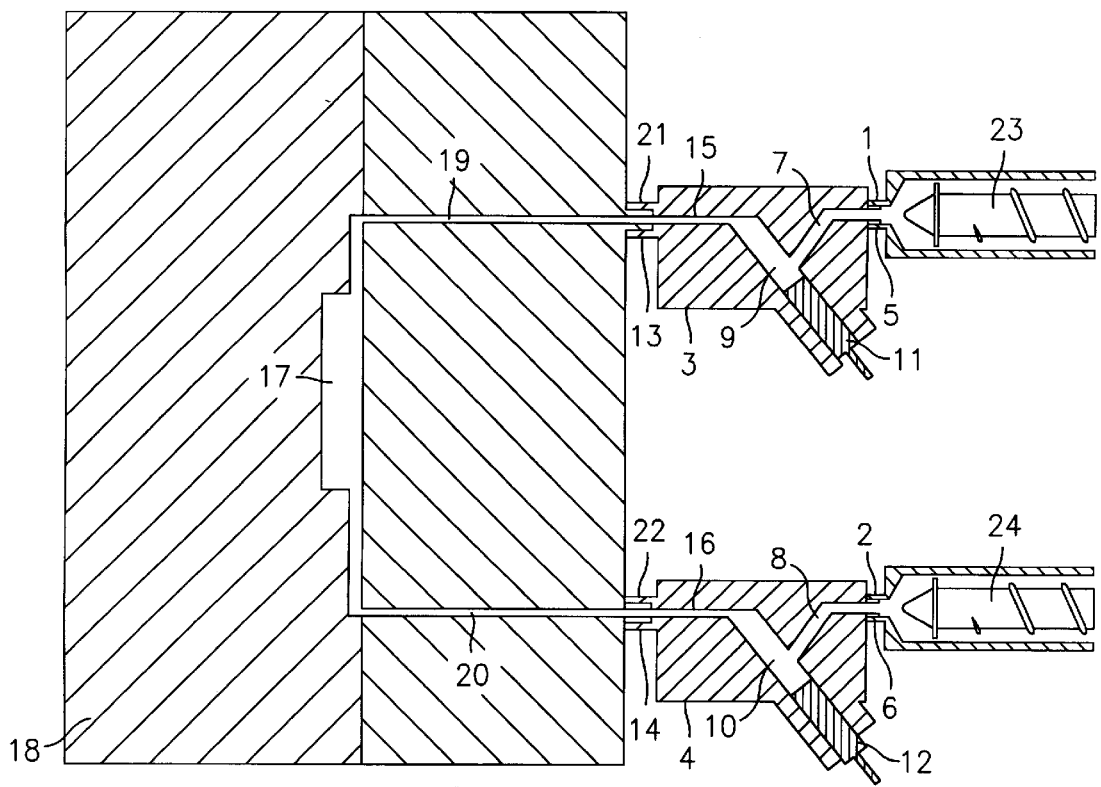
FIG. 3 is a schematic diagram of a preferred embodiment of apparatus in which means for periodically generating a shearing force is placed between injection barrels and a mould.

FIG. 3 is a schematic diagram of apparatus in which means for periodically generating shear force devices are placed in between the injection barrels and the mould.

Two nozzles 1 and 2 form pairs with manifolds 3 and 4 and bushes 5 and 6, respectively, and the bushes are connected to channels 7 and 8, respectively, in the manifolds, and further, the channels are connected to cylinders 9 and 10, respectively, in the upper stream. These cylinders 9 and 10 are provided with driving pistons 11 and 12, respectively, which are inserted in the directions of the axes of the respective cylinders. On the other hand, the cylinders 9 and 10 are connected to channels 15 and 16, respectively, positioned in the same axial directions as those of the nozzles 13 and 14 positioned at the outlets of the manifolds 3 and 4.

The nozzles 13 and 14 are connected to a mould 18 having the respective sprues, the respective runners and a bar-shaped mould cavity 17, and sprues 19 and 20 and resin-inlets 21 and 22 are connected to the manifold outlet nozzles 13 and 14, respectively.

A moulding apparatus is fabricated when used and the mould is generally set at a temperature of from 20 to 80° C. by means of a temperature regulator using a usual refrigerant. A particulate polymer material is fed from a feed hopper to a slender cavity and heated by a cylindrical barrel heater (not shown in the figures). The molten polymer materials stocked in their respective reservoirs (not shown in the figures) are further heated, plasticized and sufficiently homogenised by revolution of an injection screw. When the viscosities of the molten polymer materials reach appropriate values, an propelling force is applied so that the molten materials are injected by the revolution or displacements of the injection screw into a mould cavity which is necessary heated previously to the desired temperature by high-frequency induction heating. At this time, the speeds of injection by the injection cylinders 23 and 24 are varied. For example, the moving speeds of the cylinders are set so that the cylinder 23 is moved forward faster than the cylinder 24. The molten polymer material injected from the cylinder 23 enters the manifold 3 and is subsequently advanced to the cylinder 9, the nozzle 13, the sprue 19, the mould cavity 17 and the sprue 20 in this order, and connected there with the molten polymer injected at a lower speed from the cylinder 24 and suspended in the runner or sprue 20.

The pistons 11 and 12 are reciprocated at the same frequency, but out of phase with each other by 180°. The reciprocation generates a periodic force to keep the molten polymer materials under a reciprocal shearing force generating a successive shear heat in the mould cavity, the sprue, the manifold and the channels 15 and 16, and the rate of cooling the molten resin material is controlled by a suitable microprocessor control (not shown in the figures). In said reciprocating motion, as stated on FIG. 1, the necessary rest time is provided between the reciprocating motions so that each of the molten materials solidifies in the form of a layer in the mould cavity 17.

After completion of the reciprocating motion of a phase difference of 180° and when the moulded article in the mould has been substantially solidified but the gate portion has not been solidified, the pistons may be moved in phase with each other so as to supplement the filling force due to an injection screw until the gate is sealed.

Subsequently, the moulded article is released from the mould and the injection screw is moved upstream for the subsequent moulding cycle with metering the molten material to be injected as a next shot.

Figure 4:
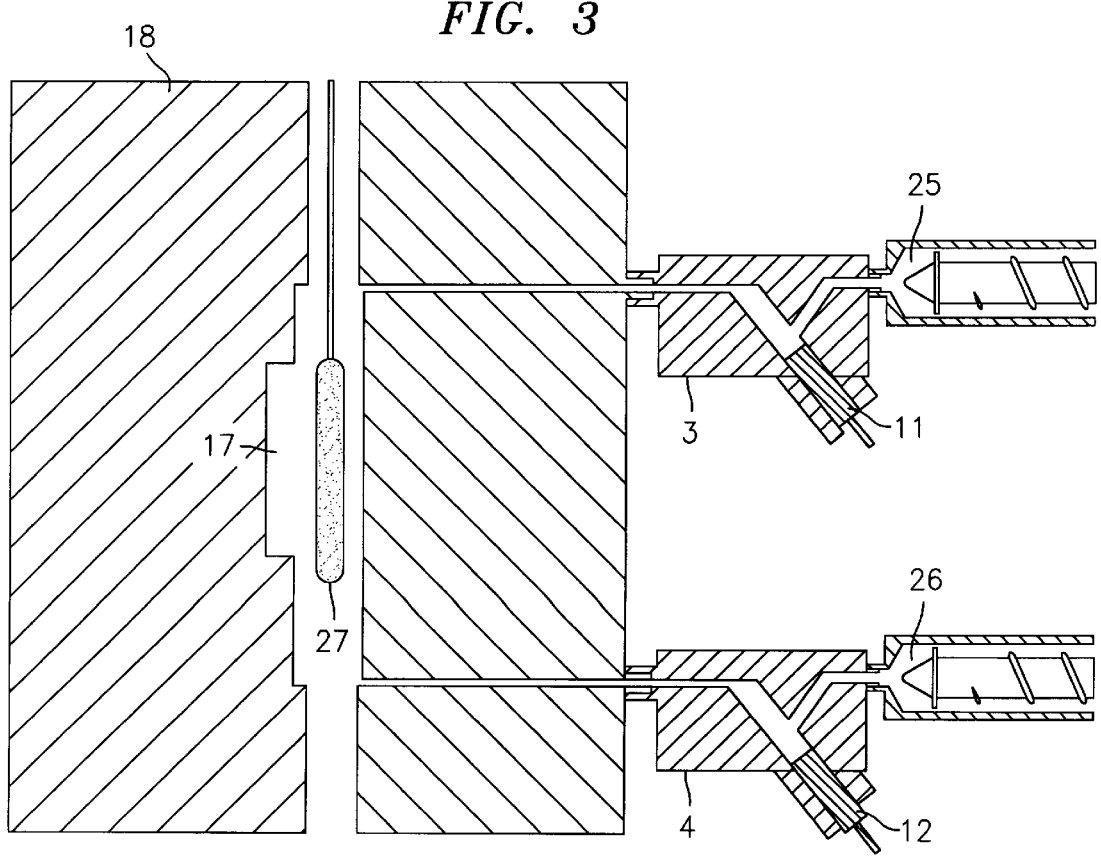
FIG. 4 is a schematic diagram of a portion near the mould of apparatus in which an inductance-sandwich system high-frequency induction heating method is used.

FIG. 4 is a schematic diagram of the portion near the mould of a moulding apparatus using an inductor-sandwich system high frequency induction heating method. An inductor 27 is placed between the fixed mould and the moving mould by robot-control (not shown in the figures). When a high frequency is generated, the surface temperature of the mould is quickly elevated but the interior of the mould is heated little. When the surface temperature of the mould reaches the desired temperature, the mould is further opened, the inductor 27 is withdrawn from between the fixed mould and the moving mould by robot-control. Thereafter, clamping is effected and the molten resins A and B are injected into the mould cavity through injection cylinders 25 and 26 and manifolds 3 and 4, respectively. Further, according to the methods shown in FIGS. 1A to 1D and 2A to 2D, a multilayer moulded article is prepared, provided that a shearing force is applied to the molten resin by the pistons 11 and 12 shown in the figures. The other details of high-frequency induction heating means and mould construction are stated in Japanese Patent Application Kokoku No. 58-40, 504 and U.K. Patent No. 2,081,171, and the contents thereof are included herein by referring thereto.

Figure 5:
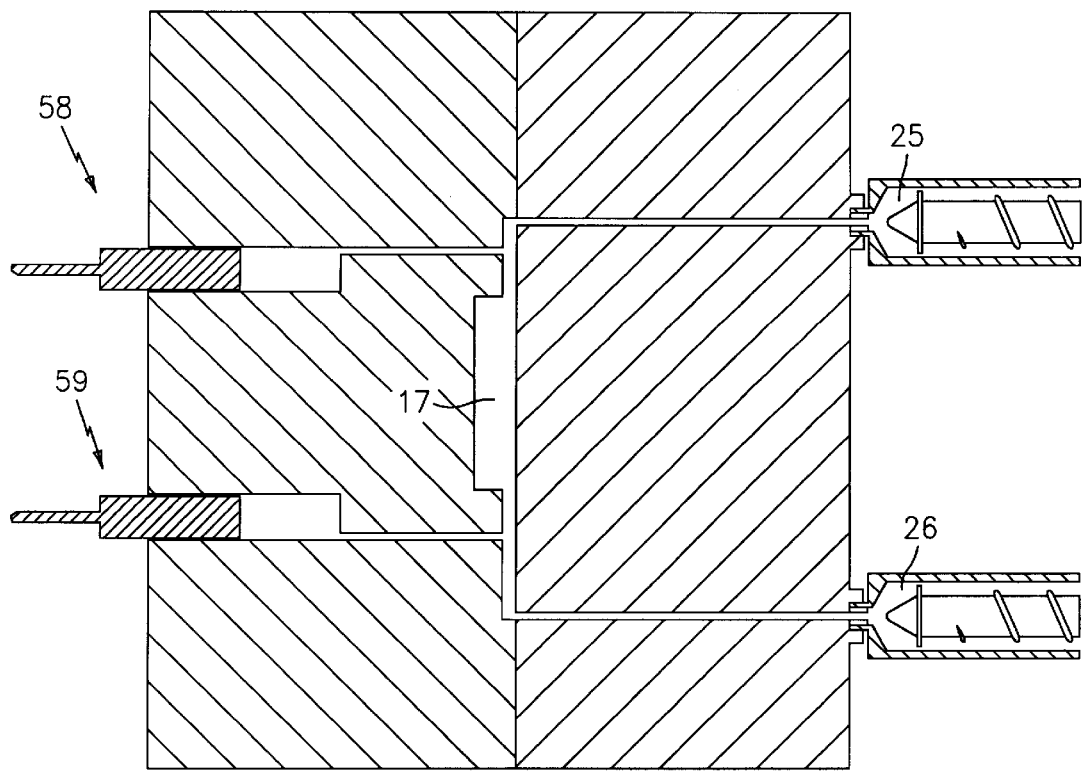
FIG. 5 is a schematic diagram of apparatus in which the means for periodically generating a shearing force is based on another system different from that in FIG. 3.
Figure 6A:
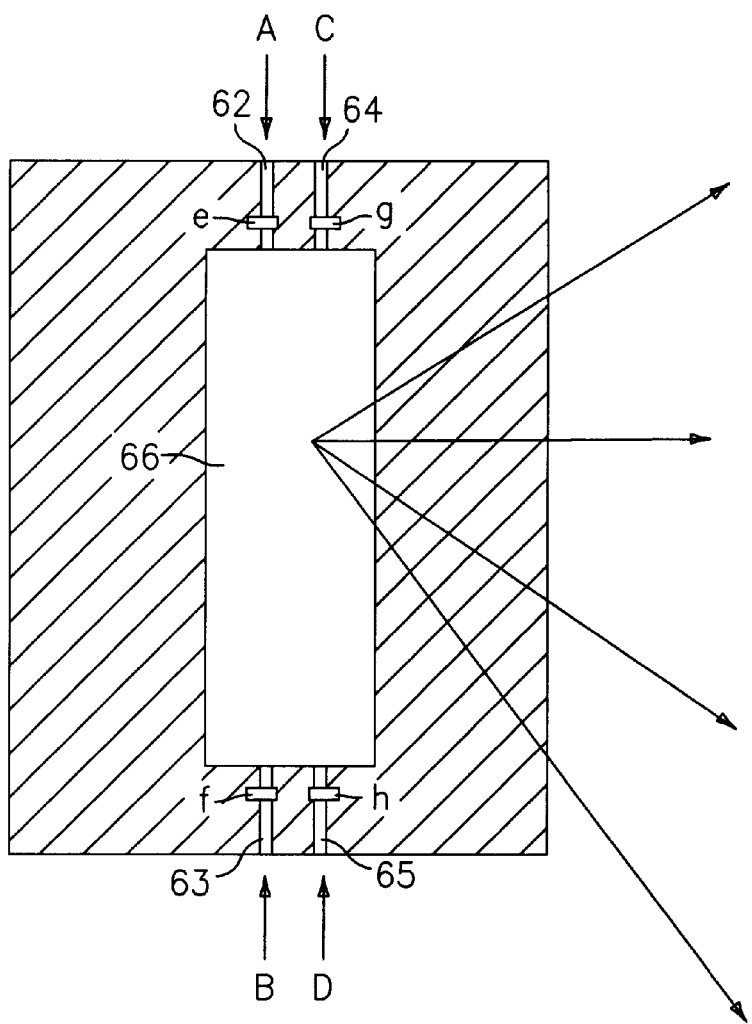
FIGS. 6A to 6E are schematic views of the case where a multilayer moulded article is prepared using four kinds of materials.
Figure 6B:
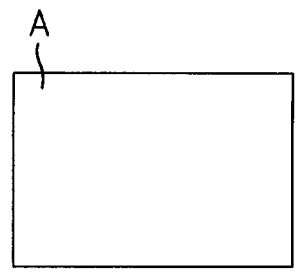
Figure 6C:
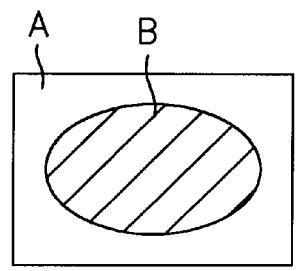
Figure 6D:
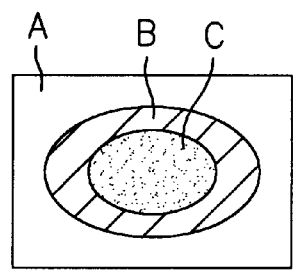
Figure 6E:
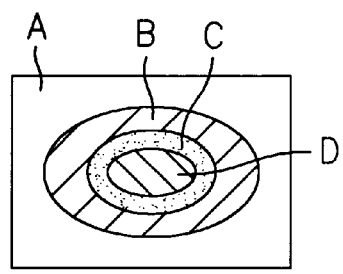
Figure 7:
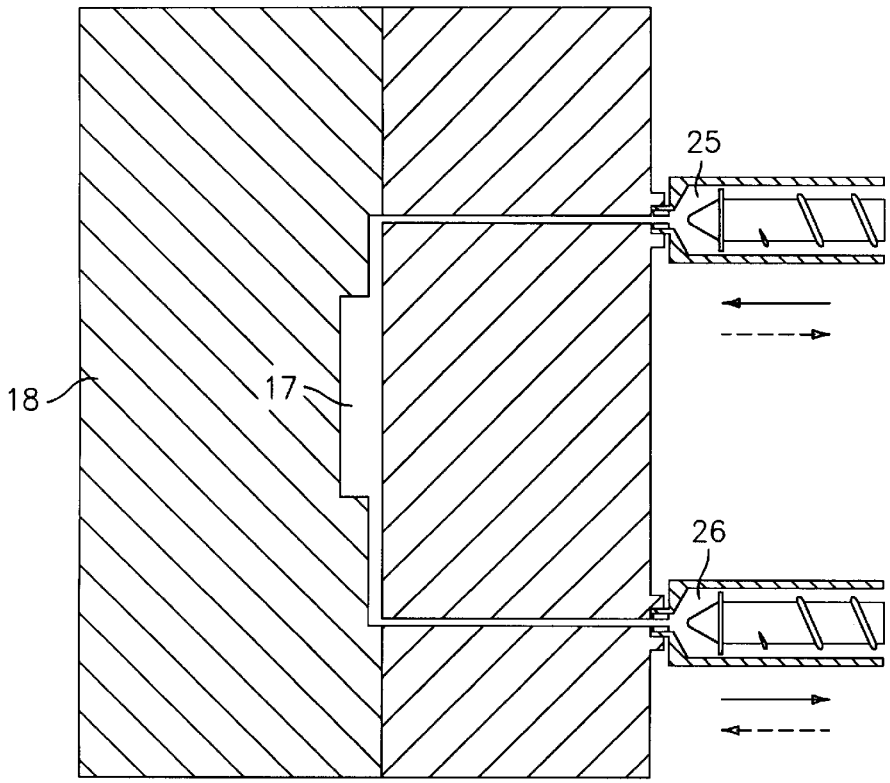
FIG. 7 is a schematic diagram of a system in which the means for periodically generating a shearing force utilises the cylinder of a conventional injection moulding machine.

FIG. 5 is a schematic diagram of a moulding apparatus in which the means of generating the periodic shearing force 58, 59 are of another system different from that in FIG. 3.

Said two means 58, 59 are placed in a position other than between the mould and the injection cylinder for feeding the resin. Said mean may, if necessary, be placed in the mould or on the outside of the mould. Only one said means may be placed between the mould and the injection cylinder for feeding the resin and the other means may be placed in a position other than between the mould and the injection cylinder for feeding the resin.

FIGS. 6A to 6E are schematic illustrations of the case of preparing a multilayer moulded article using four kinds of materials.

When four kinds of materials A, B, C and D are injected into a mould cavity from their respective feed openings through runners 62, 63, 64 and 65, respectively, a multilayer moulded article is prepared via the following course. The runners are preferably provided with shaft valves e, f, g, and h, respectively.

First of all, in Stage 1, the shaft valve e is opened and the molten material is filled into a mould cavity 66. Subsequently, in Stage 2, the valve f is opened while the valve e is left opened, and the molten material B is injected while a force is applied to the molten material A injected into the mould cavity, thereby allowing the molten material A to flow backward against the feeding direction in Stage 1. In this case, the mould temperature and the flowing time and retention time of the molten materials are set so that the material B is solidified to form a second layer having the desired wall thickness. Moreover, in Stage 3, while the valve e is closed and the valve f is left open, the valve g is opened and the molten material C is injected into the mould cavity. At this time, it is preferable to apply a force to the unsolidified molten material in the mould cavity. In this case, too, an adequate flowing time and retention time of the molten material are set so that the material C solidifies. Subsequently, in Stage 4, the valve f is closed and the valve h is opened while the valve g is left open and the molten material D is injected. Further, if necessary, a multilayer moulded article having 5 or more layers may be prepared.

Depending upon the desired characteristics, the resins may be injected in any order; however, the unsolidified portions of the molten materials are allowed to flow backward against their feed directions in the subsequent stages of filling.

In the above-mentioned method, too, the moulding is effected so that the connection point of each of the resins is positioned in the runner or sprue, whereby in the subsequent shot, only one material is fed from each of the feed openings.

Examples below explain in more detail the preferred processes.

EXAMPLE 1

Figure 8:
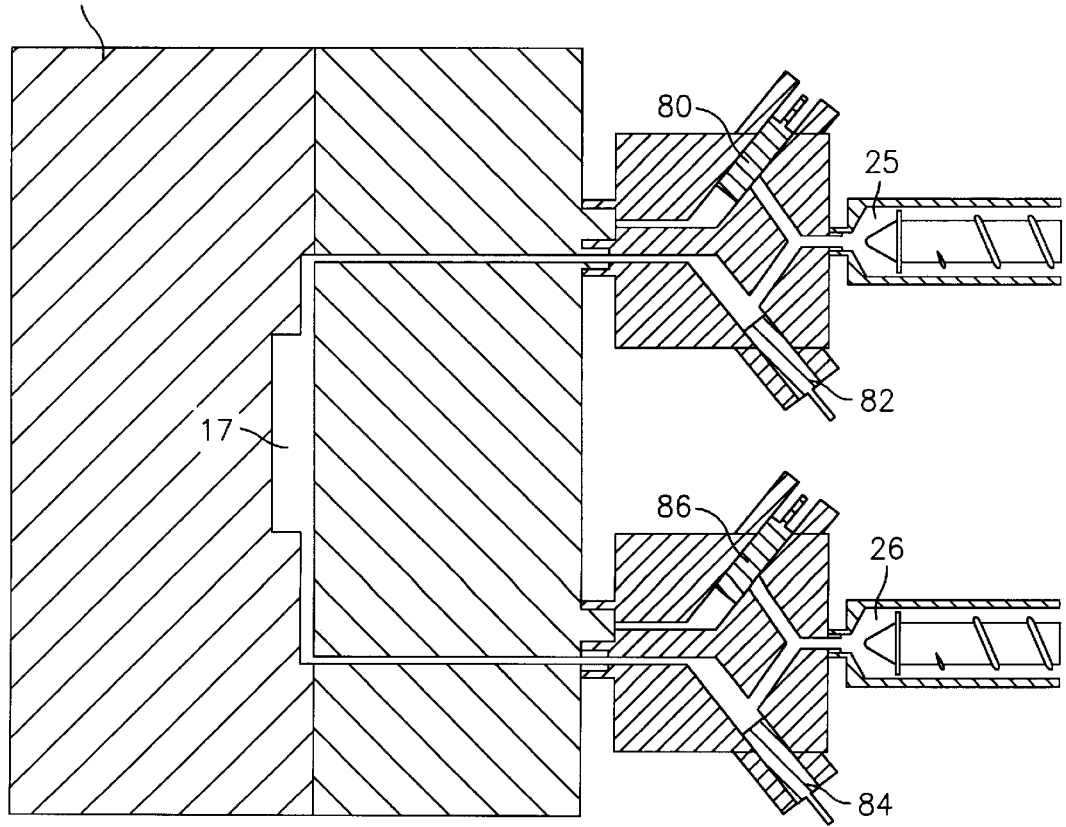
FIG. 8 is a schematic diagrams of the shear force devices and the mould for a twin barrel injection moulding machine used in Examples 1 and 4 described hereinafter.

In this Example, shear force control devices were mounted on an injection moulding apparatus as shown in FIG. 8 and moulding was conducted by the method showing in FIGS. 9A to 9D. As an injection moulding machine, there was used a moulding machine having two injection barrels 25, 26, and to one of the barrels 25 was fed a general purpose polystyrene (GPPS) 70 from a hopper and to the other barrel 26 was fed a high density polyethylene (HDPE) 72 from another hopper. and then the polystyrene and the polyethylene subjected to injection moulding. The mould used was a mould made of steel and the shape of the moulded article was a bar of 4 mm in thickness and 10 mm in width based on the ISO specification (ISO 524). The mould was set at a temperature of 20° C. by means of a temperature regulators using usual refrigerated water.

Figure 11:
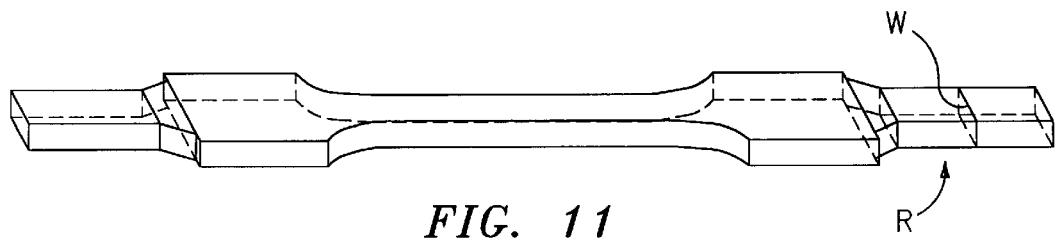
FIG. 11 is a schematic diagram of a moulded article as prepared in Examples 1, 2, 3, 4 and 5 described hereinafter.

The temperatures of the injection barrels were adjusted so as to obtain a resin temperature of 210° C. Each of the resins was heated and plasticized in the cylinder and GPPS was injected into the mould cavity at an injection pressure of 100 bar at an injection speed set at 20% of the capability of the injection moulding machine through a manifold and HDPE was injected into the mould cavity at an injection pressure of 100 bar at an injection speed set at 70% of the capability of the injection moulding machine through a manifold. As shown in FIG. 11, by the above setting, moulding was conducted so that the weldline W of the outermost layer was formed in the runner portion R of a moulded article. At this time, only HDPE 72 was injected into the mould cavity.

Figure 9A:
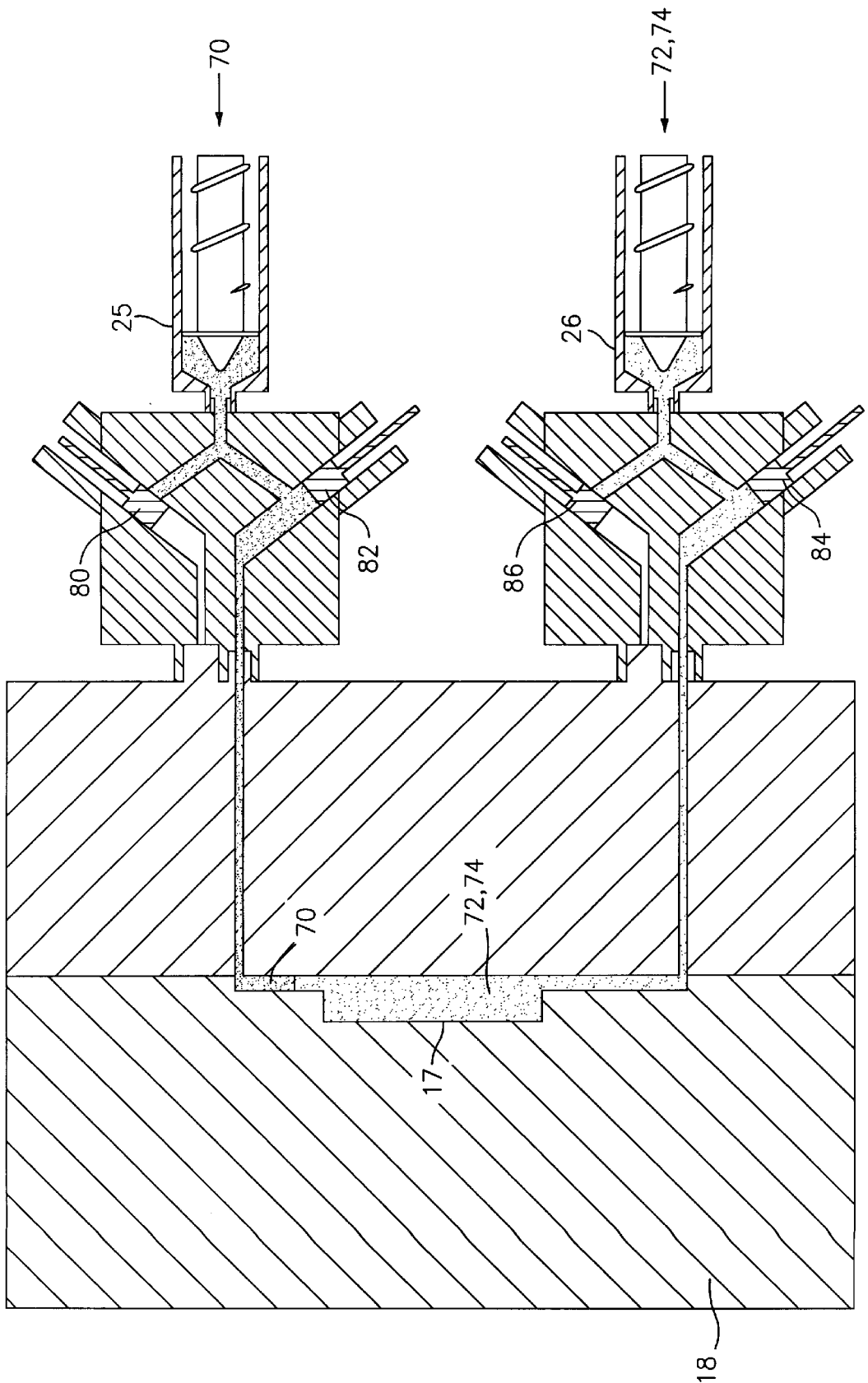
FIGS. 9A to 9D are schematic representations of the moulding process carried out in Examples 1 and 4 described hereinafter.
Figure 9B:
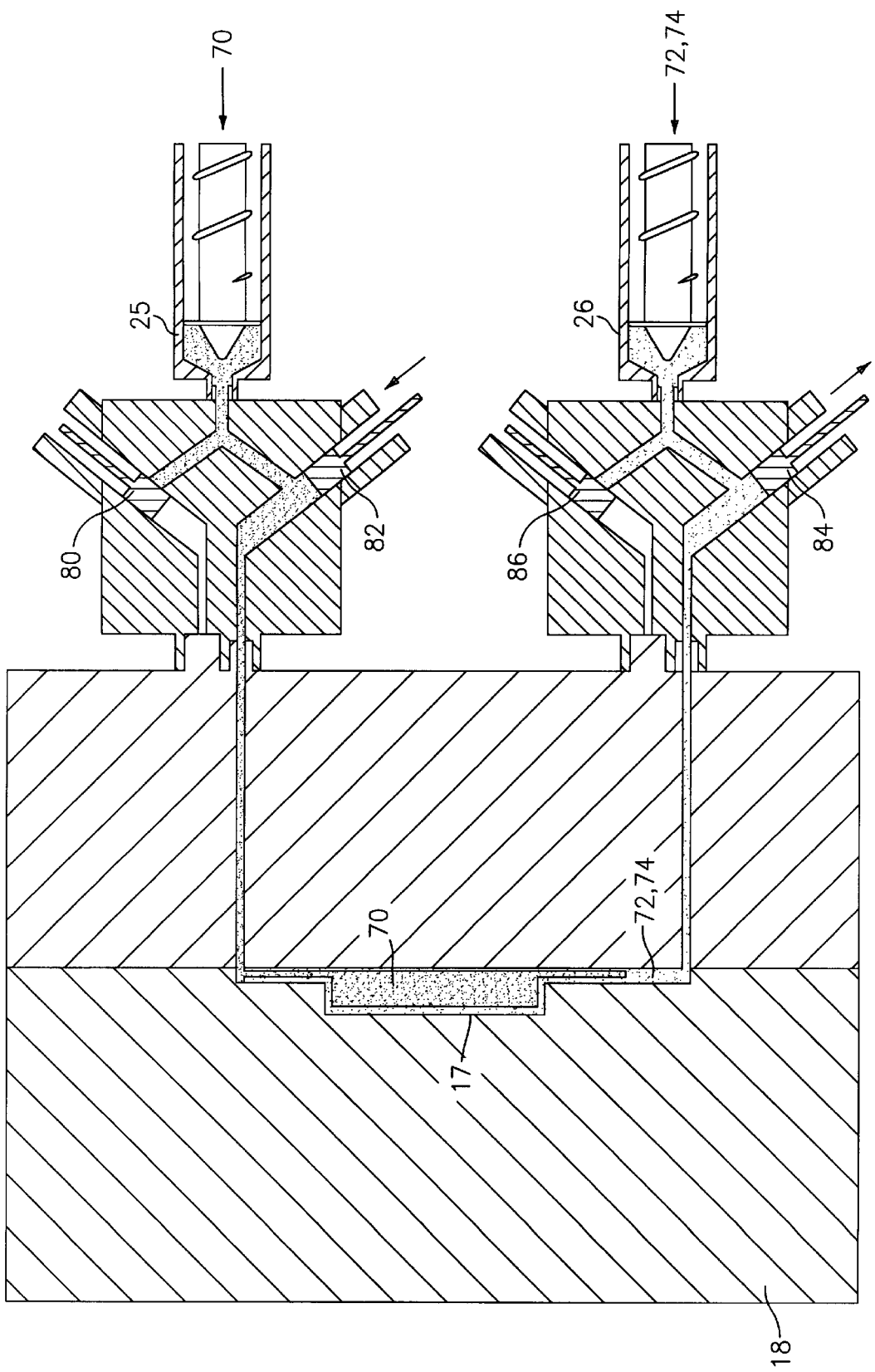

Immediately thereafter, the pistons 82 and 84 shown in Stage 2 of FIG. 9B were actuated at the same frequency, but out of phase with each other by 180°. Such a force as to inject GPPS 70 into the mould cavity was applied to the piston 82 and such a force in the opposite direction to piston 84 that the unsolidified HDPE 72 was pushed back out from the mould cavity. Each of the pistons 82 and 84 was actuated for 2 seconds and retained in that position for 2 seconds.

Figure 9C:
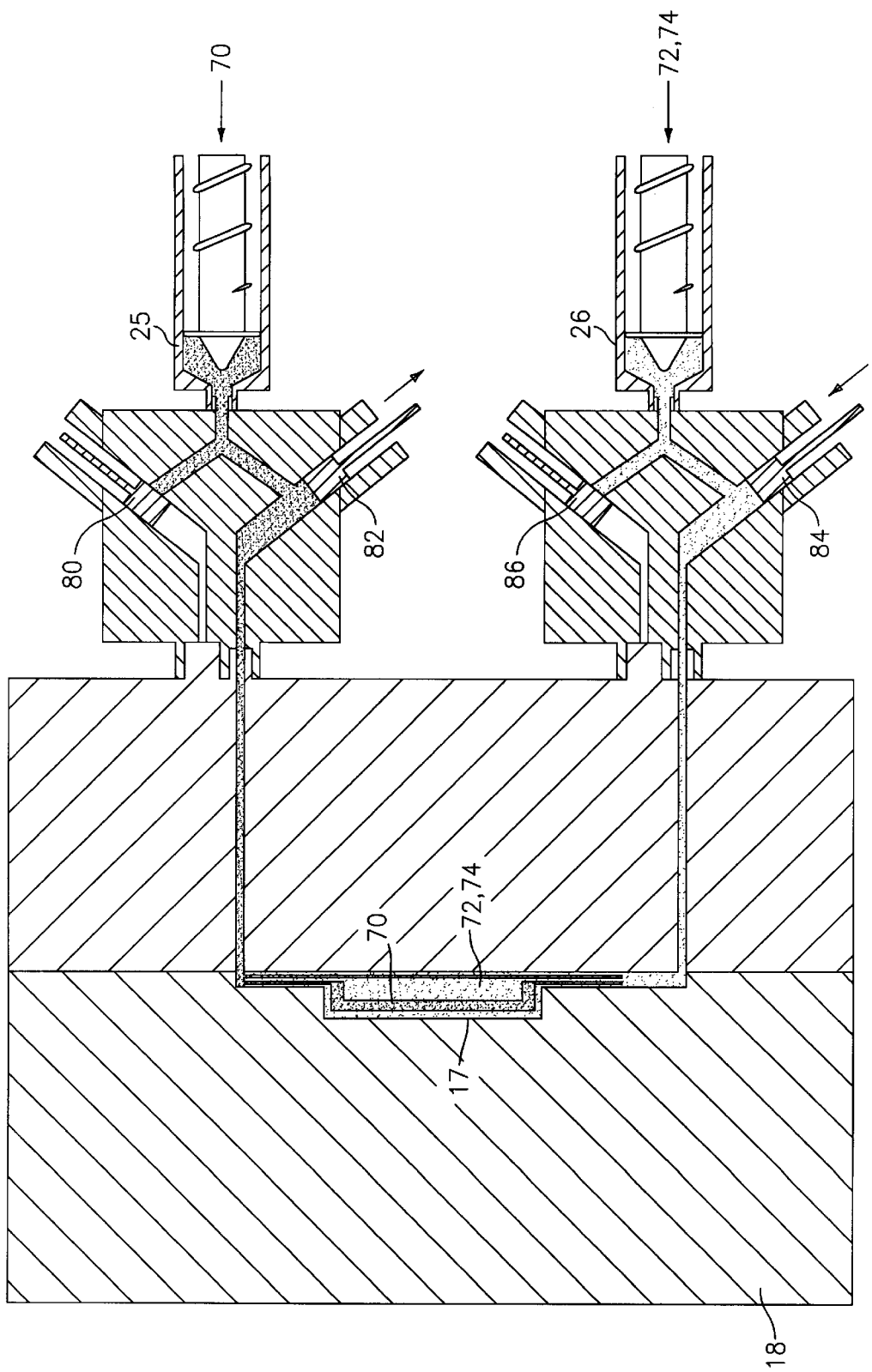

Subsequently, the pistons 82 and 84 shown in Stage 3 of FIG. 9C were actuated at the same frequency, but out of phase with each other by 180°. Such a force as to inject HDPE 72 into the mould cavity was applied to the piston 84 and such a force that unsolidified GPPS 70 was pushed back from the mould cavity was applied to the piston 82. Each of the pistons 82 and 84 was actuated for 2 seconds and stopped in that position for 3 seconds.

Figure 9D:
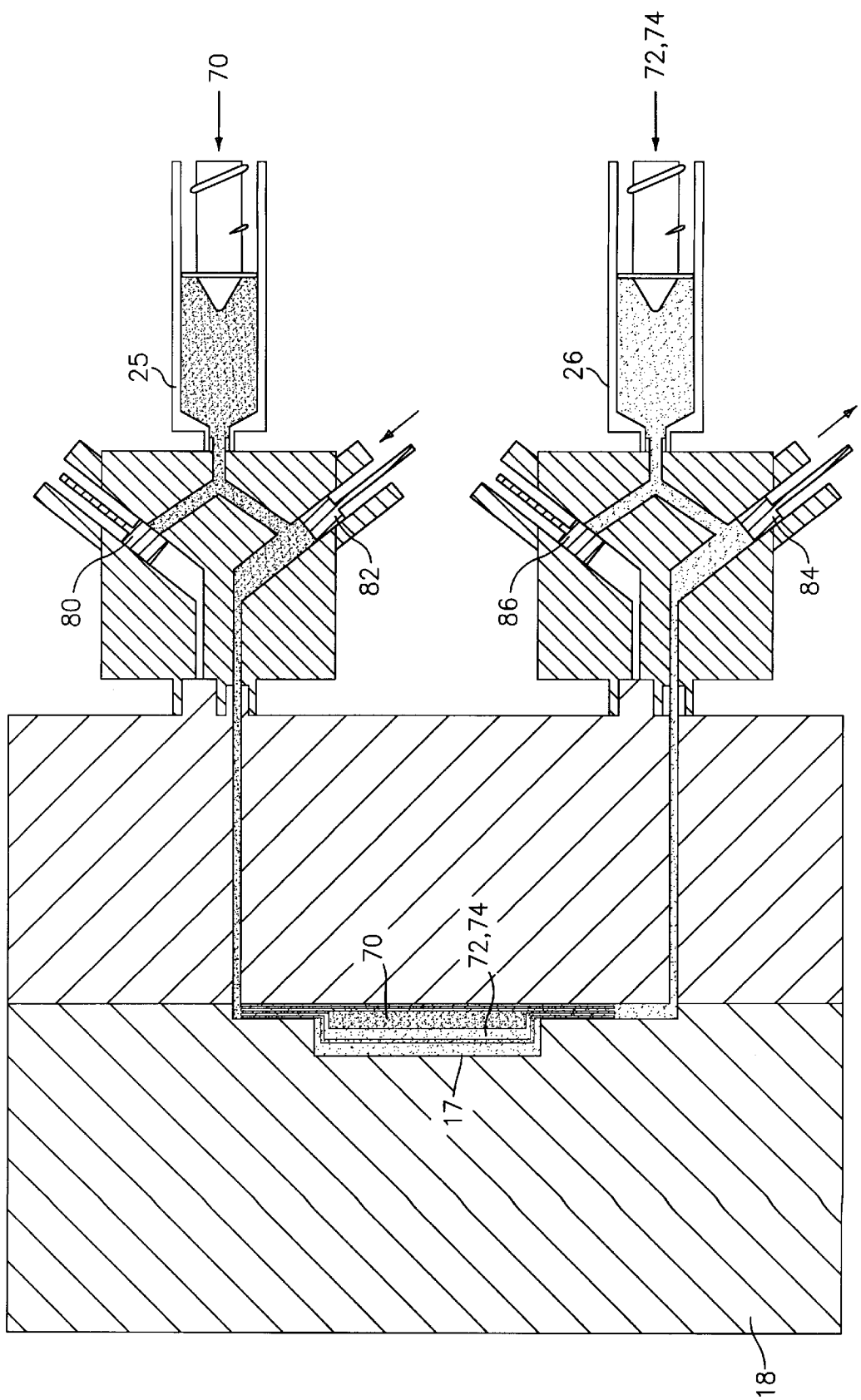

Further, the pistons 82 and 84 shown in Stage 4 of FIG. 9D were actuated at the same frequency, but out of phase with each other by 180°. Such a force as to inject GPPS 70 into the mould cavity was applied to the piston 82, and such a force was applied to the piston 84 that the unsolidified HDPE 72 was pushed back from the mould cavity. Each of the pistons 82 and 84 was actuated for 2 seconds and retained in that position for 2 seconds.

The flexural properties of the moulded article were determined by 3-point flexural testing at room temperature (23° C.) at a cross-head speed of 3 mm/min.

The tensile properties of the moulded article were determined by carrying out tensile testing at room temperature (23° C.) at a cross head speed of 5 mm/min.

In the impact test, a test specimen in the form of a ribbon was cut from the moulded article and subjected to a notching machine to make a type A notch of the ISO specification (ISO 180) on the specimen. This notched test specimen was used. The impact test was conducted using an Izod impact tester at room temperature (23° C.).

Figure 12:
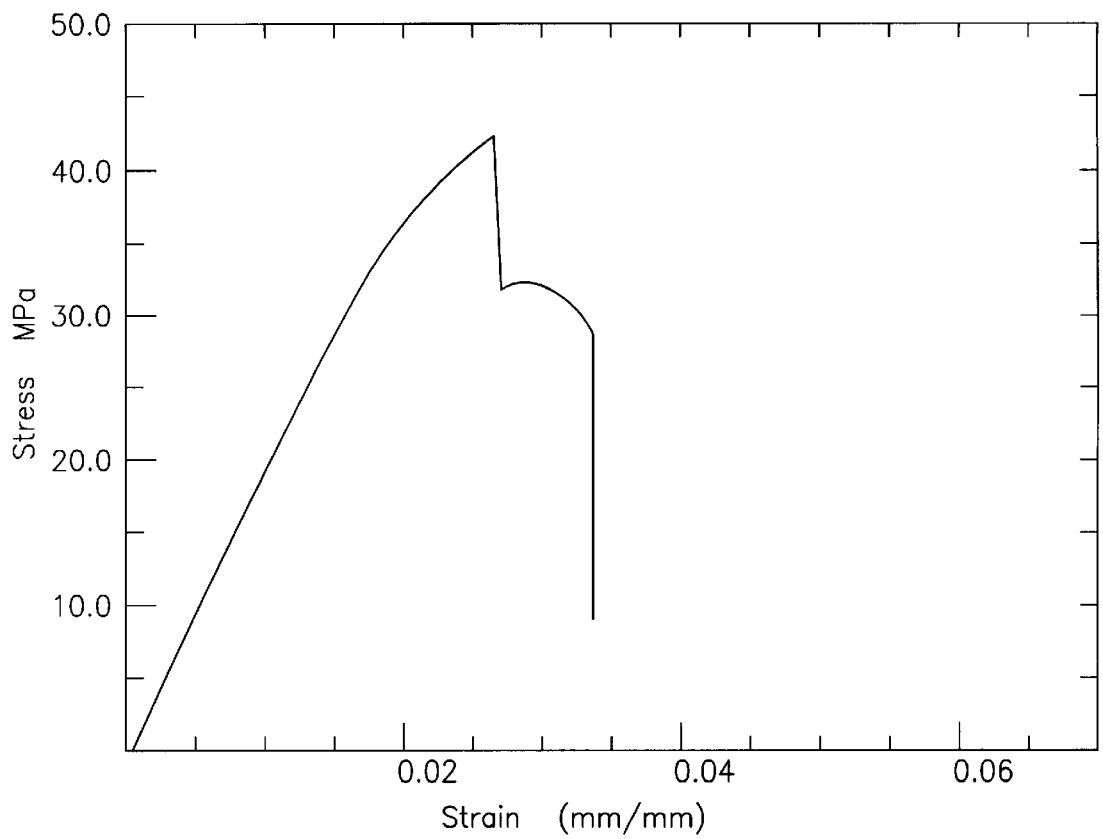
FIG. 12 is a chart showing a stress-strain curve in the tensile testing of a moulded article prepared in Example 1 described hereinafter.

The results of the flexural test and the tensile test are given in Table 1. The stress-strain curve obtained in the tensile test is shown in FIG. 12.

Figure 13A:
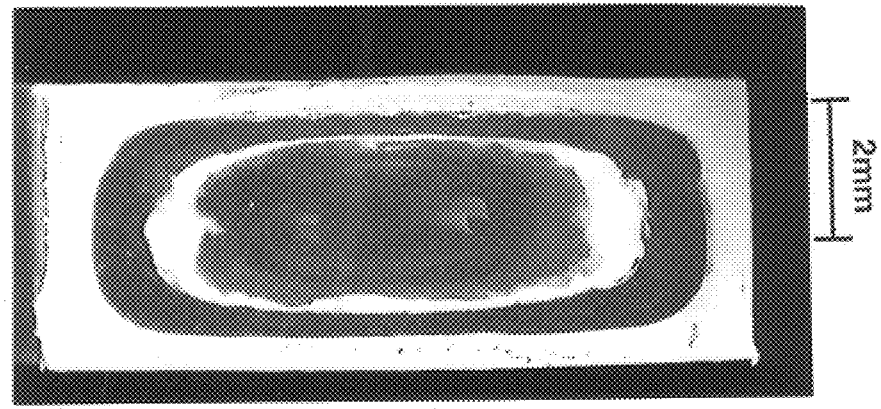
FIGS. 13A to 13C show the results of observation by means of an optical microscope of the cross-section of moulded articles prepared in Examples 1, 2 and 3 described hereinafter.

The results of the microscopic observation of the cross-section of the moulded article are shown in FIG. 13A.

EXAMPLE 2

In this Example. a high-frequency induction heating and shear force control devices were mounted on an injection moulding apparatus and moulding was conducted using the apparatus. The moulding process was the method shown in FIGS. 10A to 10D.

As the injection moulding machine, a moulding machine having two injection barrels 25, 26 was used and to one of the barrels 25 was fed a general purpose polystyrene (GPPS) 70 from a hopper and to the other cylinder 26 was fed a high density polyethylene (HDPE) 72 from another hopper, after which the polystyrene and the polyethylene were subjected to injection moulding. The mould used was a mould made of steel and the shape of the moulded article was a bar of 4 mm in thickness and 10 mm in width based on the ISO specification (ISO 524).

Figure 10A:
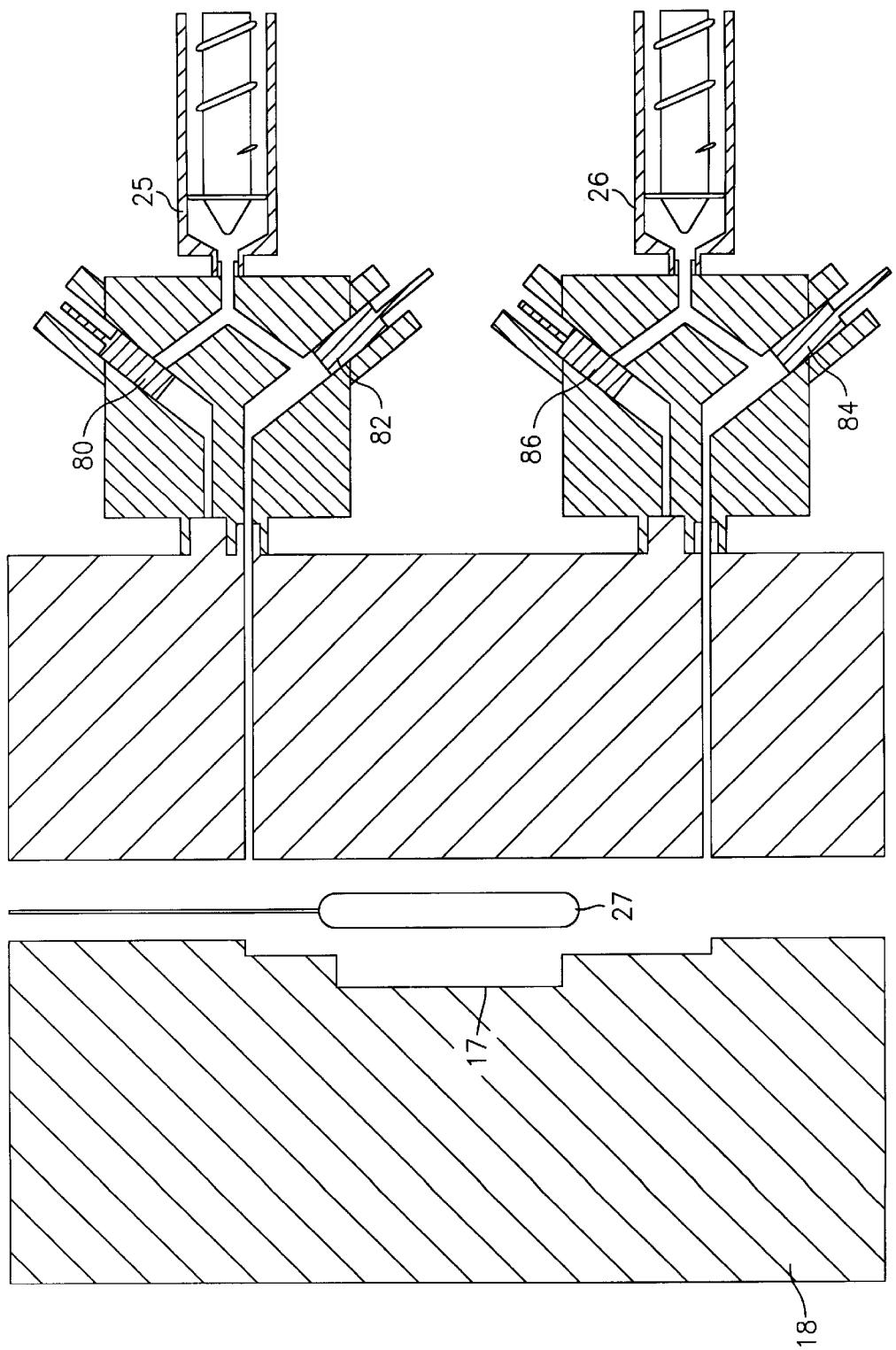
FIGS. 10A to 10D are schematic representations of the moulding process carried out in Examples 2, 3 and 5 described hereinafter.

An inductor 27 for high-frequency induction heating was inserted into the position shown in Stage 1 of FIG. 10A in a mould whose temperature was set at 20° C. by means of a temperature regulator using usual refrigerant water, and oscillated at a frequency of 20 kHz at an power output of 15 kW for 5 seconds. The distance between the inductor and the moving mould surface and the distance between the inductor and the fixed mould surface when the high frequency was generated were both 8 mm.

The temperatures of the injection barrels were adjusted so as to obtain a resin mixture temperature of 210° C. The resins were heated and plasticized in the respective barrels and subsequently the molten materials were injected into the mould cavity (similar to the manner shown in FIG. 9A) through the respective manifolds, and under such conditions that in the case of GPPS 70, the injection pressure was 100 bar and the injection speed was set at a value of 20% of the capability of the injection moulding machine. In the case of HDPE 72, the injection pressure was 100 bar and the injection speed set at a value of 70% of the capability of the injection moulding machine. By the above setting, moulding was conducted so that as shown in FIG. 11 the weldline W of the outer most layer was formed in the runner portion R of the moulded article.

Figure 10B:
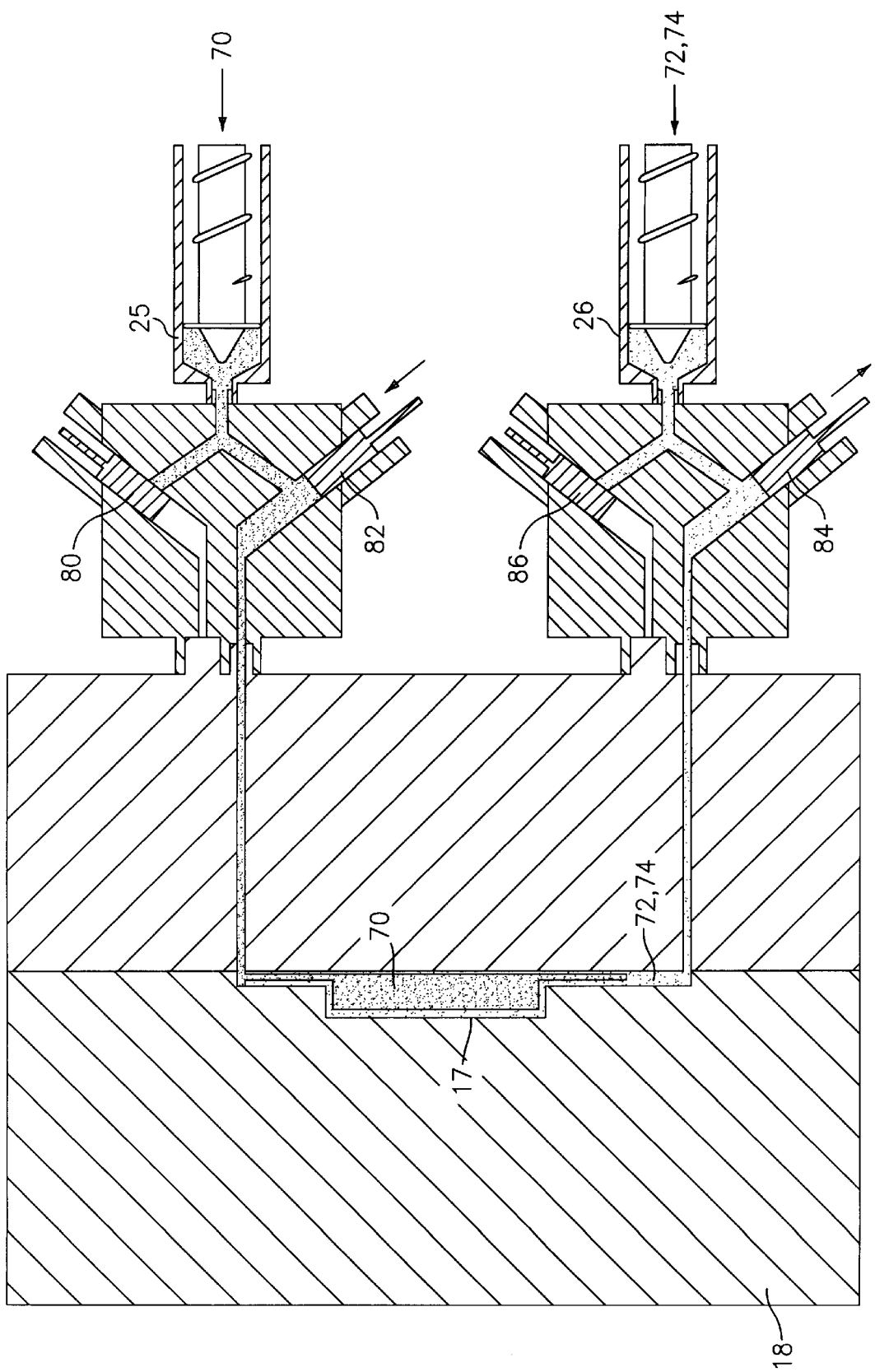

Immediately thereafter, the pistons 82 and 84 shown in Stage 3 of FIG. 10B were actuated at the same frequency, but out of phase with each other by 180°. To the piston 82 was applied such a force as to inject GPPS 70 into the mould cavity and to the piston 84 was applied such a force that unsolidified HDPE 72 was pushed back out from the mould cavity. Each of the pistons 82 and 84 was actuated for 2 seconds and retained in that position for 2 seconds.

Figure 10C:
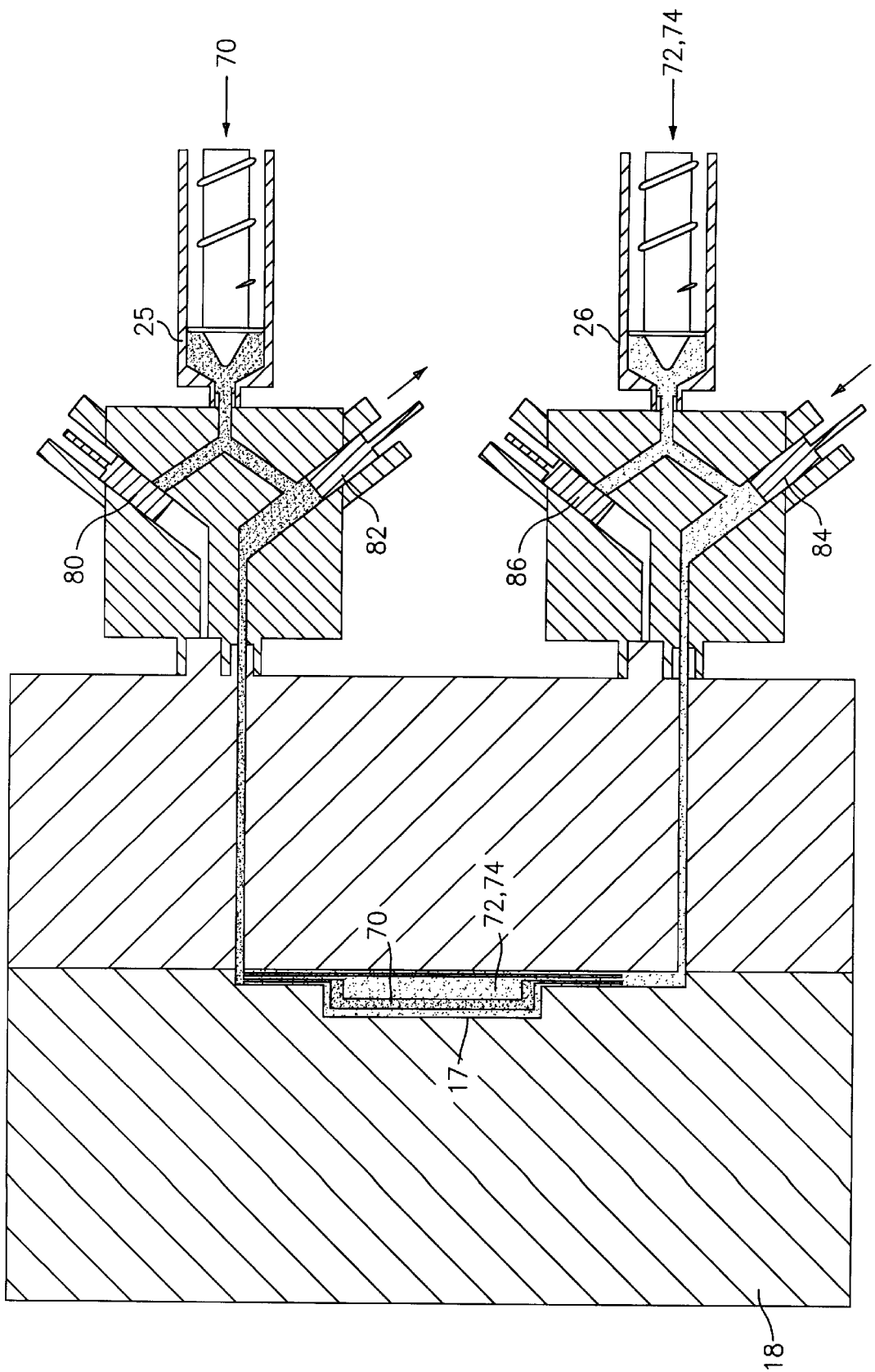

Further, as shown in Stage 4 of FIG. 10C, the pistons 82 and 84 were actuated at the same frequency, but out of phase with each other by 180°. To the piston 84 was applied such a force to inject HDPE 72 into the mould cavity and to the piston 82 was applied such a force that unsolidified GPPS 70 was pushed back out from the mould cavity. Each of the pistons 82 and 84 was actuated for 2 seconds and retained in that position for 2 seconds.

Subsequently, the pistons 82 and 84 were actuated at the same frequency, but out of phase with each other by 180°. To the piston 82 was applied such a force as to inject GPPS 70 into the mould cavity and to the piston 84 was applied such a negative force that unsolidified HDPE 72 was pushed back out, from the mould cavity. Each of the pistons 82 and 84 was actuated for 2 seconds and retained in that position for 2 seconds.

The flexural properties of the moulded article were determined by 3-point flexural testing at room temperature (23° C.) at a cross-head speed of 3 mm/min.

The tensile characteristics of the moulded article were evaluated by conducting a tensile test at room temperature (23° C.) at a drawing rate of 5 mm/min.

In the impact test, a test specimen was cut from the moulded article in the form of a ribbon and subjected to a notching machine to make a type A notch of the ISO specification (ISO 180), and this notched test specimen was used. The impact test was conducted using an Izod impact tester at room temperature (23° C.).

The results of the flexural and tensile tests are given in Table 1.

Figure 13B:
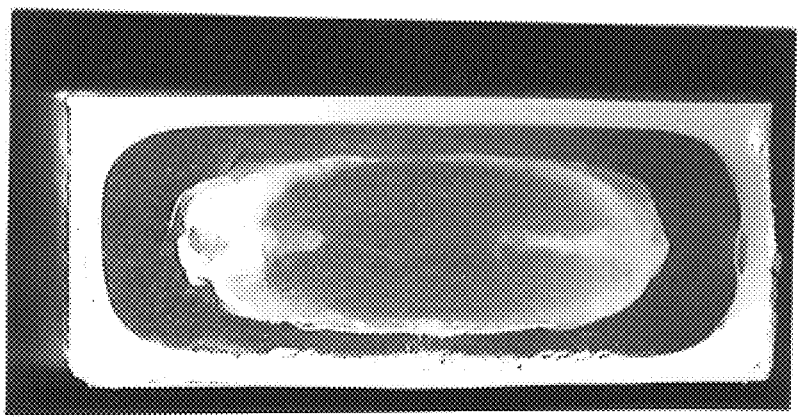

The results of microscopic observation of the cross-section of the moulded article are shown in FIG. 13B.

EXAMPLE 3

In this Example, a high-frequency induction heating and shear force control devices were mounted on an injection moulding apparatus and moulding was conducted using the apparatus. The moulding process was according to the procedure shown in FIGS. 10A to 10D.

As the injection moulding machine, a injection moulding machine having two injection barrels was used and to one of the barrels was fed a general purpose polystyrene (GPPS) 70 from a hopper and to the other barrel was fed a high density polyethylene (HDPE) 72 from another hopper, after which the polystyrene and the polyethylene were subjected to injection moulding. The mould used was a mould made of steel and the shape of the moulded article was a bar of 4 mm in thickness and 10 mm in width based on the ISO specification (ISO 524).

An inductor 27 for high-frequency induction heating was inserted into the position shown in Stage 1 of FIG. 10A in a mould whose temperature was set at 20° C. by means of a temperature regulator using usual refrigerant water, and oscillated at a frequency of 20 kHz at a power output of 15 kW for 5 seconds.

The distance between the inductor and the moving mould surface and the distance between the inductor and the fixed mould surface when the high frequency was generated were both 8 mm.

The temperatures of the injection barrels were adjusted so as to obtain a resin mixture temperature of 210° C. The resins were heated and plasticized in the respective cylinders and subsequently the molten materials were injected into the mould cavity, similar to the manner shown in FIG. 9A, through the respective manifolds under such conditions that in the case of GPPS 70, the injection pressure was 100 bar and the injection speed was set at a value of 20% of the capability of the injection moulding machine and in the case of HDPE 72, the injection pressure was 100 bar and the injection speed was set at a value of 70% of the capability of the injection moulding machine. By the above setting, moulding was conducted so that as shown in FIG. 11, the weldline W of the outermost layer was formed in the runner portion R of the moulded article.

Immediately thereafter, the pistons 82 and 84 shown in Stage 3 of FIG. 10B were actuated at the same frequency, but out of phase with each other by 180°. To the piston 82 was applied such a force as to inject GPPS 70 into the mould cavity and to the piston 84 was applied such a force that unsolidified HDPE 72 was pushed back from the old cavity. Each of the pistons 82 and 84 was actuated for 1.5 seconds and retained in that position for 1.5 seconds.

Further, as shown in FIG. 10C, the pistons 82 and 84 were actuated at the same frequency, but out of phase with each other by 180°. To the piston 84 was applied such a force as to inject HDPE 72 into the mould cavity and to the piston 82 as applied such a force that unsolidified GPPS 70 was pushed back out from the mould cavity. Each of the pistons 82 and 84 was actuated for 2 seconds and retained in that position for 2.5 seconds.

Figure 10D:
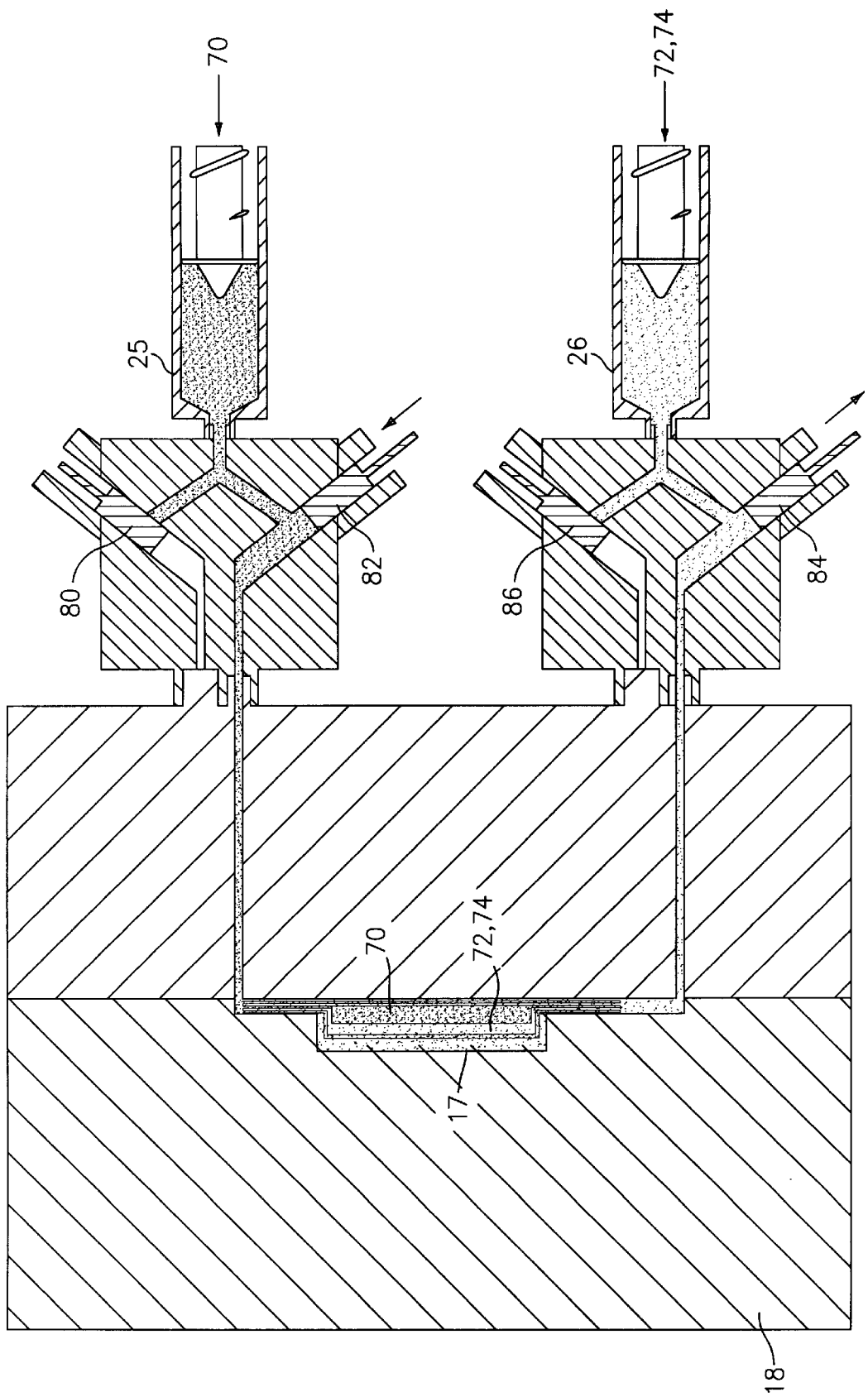

Subsequently, as shown in FIG. 10D, the pistons 82 and 84 were actuated at the same frequency, but out of phase with each other by 180°. To the piston 82 was applied such a force as to inject GPPS 70 into the mould cavity and to the piston 84 was applied such a force that unsolidified HDPE 72 was pushed back out from the mould cavity. Each of the pistons 82 and 84 was actuated for 2 seconds and retained in that position for 6 seconds.

Further, (not shown) the pistons 82 and 84 were actuated at the same frequency, but out of phase with each other by 180°. To the piston 84 was applied such a force as to inject HDPE 72 into the mould cavity and to the piston 82 was applied such a force that unsolidified GPPS 70 was pushed back out from the mould cavity. Each of the pistons 82 and 84 was actuated for 2 seconds and retained in that position for 2 seconds.

Subsequently, (not shown) the pistons 82 and 84 were actuated at the same frequency but out of phase with each other by 180. To the piston 82 was applied such a force as to inject GPPS 70 into the mould cavity and to the piston 84 was applied such a force that unsolidified HDPE 72 was pushed back out from the mould cavity. Each of the pistons 82 and 84 was actuated for 2 seconds and retained in that position for 2 seconds.

The flexural properties of the moulded article were determined by 3-point flexural testing at room temperature (23° C.) at a cross-head speed of 3 mm/min.

The tensile properties of the moulded article were determined by carrying out a tensile testing at room temperature (23° C.) at a cross head speed of 5 mm/min.

In the impact test, a test specimen in the form of a ribbon was cut from the moulded article and subjected to a notching machine to make a type A notch of the ISO specification (ISO 180) on the specimen, and this notched test specimen was used. The impact test was conducted using an Izod impact tester at room temperature (23° C.).

The results of the flexural and tensile tests are given in Table 1.

Figure 13C:
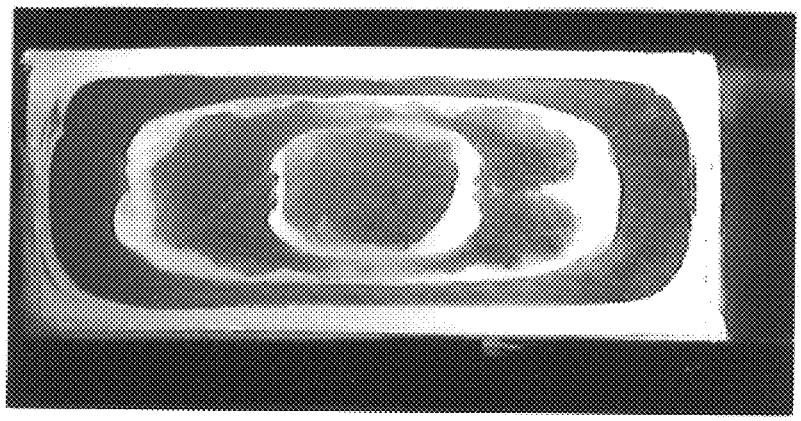

The results of microscopic observation of the cross-section of the moulded article are shown in FIG. 13C.

Reference 1

For comparison with Examples 1, 2 and 3, moulded articles of conventionally moulded GPPS 70 and HDPE 72 were prepared in the manner stated below.

In the moulding of the comparative moulded articles, a conventional injection moulding machine having one cylinder was used to prepare moulded articles of the same ISO specification as in Examples 1, 2 and 3.

The moulded conditions for the respective moulded articles are shown below.

(a) Conventional Mouldings of HDPE 72
  Resin temperature: 210° C.
  Mould temperature: 20° C.
  Cooling time: 20 sec
  Injection pressure: 100 bar
  Holding pressure: 40 bar (b) Conventional Mouldings of GPPS 70
  Resin temperature: 210° C.
  Old temperature: 20° C.
  Cooling time: 20 see
  Injection pressure: 100 bar
  Holding pressure: 40 bar The evaluation of mechanical properties was conducted using the same method and apparatus as in Examples 1, 2 and 3. The results of evaluation of mechanical properties are given in Table 1.

Reference 2

A further examination of mouldings different from the Examples referred to above was made. The same injection moulding machine, mould and moulding materials as in Example 3 were used, and for comparison with Example 3, the mould was not preliminarily heated by high-frequency induction heating, and set at a temperature of 20° C. by a temperature regulator using usual refrigerant water.

The moulding procedure used in Example 3 was repeated other than for the use of high-frequency induction heating, noting that in Example 3, a 6-layer moulded article was obtained, while in Comparative Example 2, the moulded article was obtained using a mould, the whole of which was directly preliminarily heated, was a 4 layer moulded article.

The same procedure as in Example 3 was further repeated, except that the preliminary heating by high-frequency induction heating was not used and the mould temperature was set at 60° C. by a temperature regulator using usual refrigerant water, to effect moulding. As a result, a double layer moulded article was obtained.

As is clear from the above results, the control of the mould temperature is effective in controlling the multilayer structure of a moulded article.

TABLE 1

| Moulding process | Example 1 | Example 2 | Example 3 | Reference 1 GPPS | HDPE |
|---|---|---|---|---|---|
| Flexural modulus (GPa) | 1.57 | 2.05 | 2.04 | 3.16 | 1.30 |
| Flexural strength (GPa) | 58.0 | 72.5 | 70.3 | 100 | 29.4 |
| Tensile strength (Mpa) | 39.3 | 44*3 | 40.3 | 51.9 | 22.8 |
| Impact strength (J/mm2) | 23.7 | 24.3 | 23.9 | 2.30 | 6.37 |
| Cross-sectional shape | 4 layers | 4 layers | 6 layers | 1 layer | 1 layer |
| Observation of cross-section | Figure 13A | Figure 13B | Figure 13C | — | — |
| Chemical resistance | Excellent | Excellent | Excellent | Poor | Excellent |

In Examples 1, 2 and 3. the flexural modulus is between the modulus of elasticity of GPPS 70 and the modulus of elasticity of HDPE 72. Since the modulus of elasticity of GPPS 70 is about 3 times that of HDPE 72, the thicker the GPPS 70 layer and the more outer the position of the GPPS 70 layer, the larger the modulus of elasticity of a multilayer moulded article becomes. In Examples 1 and 2, the moulded articles have 4 layers. However, since in Example 2, the mould is preliminarily heated to make the first layer thin, the second layer, namely the GPPS 70 layer, is in more outer position, so that a moulded article having a higher rigidity was able to be prepared. From the observation of the cross-section of the moulded article in FIGS. 13A and 13B, it can be seen that the outermost layer in Example 1 is thicker than that in Example 2 and hence the preliminary heating of the mould is effective for the control of the wall thickness of the moulded article.

The flexural strengths in Examples 1, 2 and 3 are values between the strength of GPPS 70 and the strength of HDPE 72. The reason why the flexural strengths in Examples 2 and 3 are larger than in Example 1 is the same as in the case of flexural modulus.

The tensile strength is also valued between the strength of GPPS 70 and the strength of HDPE 72. The tensile strength is greatly affected by the total proportion of the GPPS 70 layer. That is, the position of the GPPS 70 layer does not affect the tensile strength. From this fact, it can be seen that the reason why the tensile strength in Example 3 is smaller than in Example 2 is that the total amount of the GPPS 70 layer in Example 3 is smaller than in Example 2.

The impact strengths of the moulded articles in Examples 1, 2 and 3 are 4 times the strength of HDPE 72 which has a larger impact strength than that of GPPS 70. This is because an impact energy is absorbed at the layer interface of the layer structure and is one of the benefits of the multilayering.

In Examples 1, 2 and 3, the multilayer moulded articles are advantaged in chemical resistance. This is because the outer-most layer is of HDPE 72 having excellent chemical resistance.

It can be seen from the above results that the multilayer moulded article composed of GPPS 70 and HDPE 72 is a moulded article which has the characteristics of both the resins and further has an impact strength considerably superior to those of the two resins. In spite of the fact that HDPE 72 and GPPS 70 are incompatible with each other, the mechanical formation of a composite of the two resins is facilitated easily by forming a ring-shaped multilayer structure, and this is a great benefit of the moulded article. Also, the temperature control by preliminarily heating a mould is effective in controlling the structure of a multilayer moulded article and also effective in the preparation of a moulded article having the desired characteristics.

Thus, even when polystyrene and polyethylene which are less expensive than other resins are used, a multifunctional, high function moulded article can be prepared by controlling the fine structure of a moulded article. Thus, what has not been reached by the conventional technology has been made possible by the teachings herein.

EXAMPLE 4

In this Example, shear force control devices were mounted on an injection moulding apparatus in the same manner as in FIG. 8 in Example 1 and moulding was effected according to the same procedure as shown in FIGS. 9A to 9D. As the injection moulding machine, a injection moulding machine having two injection barrels was used, and to one of the barrels was fed a general purpose polystyrene (GPPS) 70 from a hopper and to the other barrel was fed high impact polystyrene (HIPS) 74 from another hopper, and the resins were subjected to injection moulding. The mould used was a mould made of steel and the shape of the moulded article was a bar of 4 mm in thickness and 10 mm width based on the ISO specification (ISO 524). The mould was set at a temperature of 20° C. by a general temperature regulator using refrigerant water.

The temperatures of the injection barrels were adjusted so as to obtain a resin mixture temperature of 210° C. Each of the resins was heated and plasticized in the cylinder and subsequently the molten materials of the resins were successively injected into a mould cavity though the respective manifolds under such conditions that in the case of GPPS 70, the injection pressure was 100 bar and the injection speed was set at a value of 20% of the capability of the injection moulding machine while in the case of HIPS 74, the injection pressure was 100 bar and the injection speed was set at a value of 70% of the capability of the injection moulding machine. By the above setting, the moulding was conducted so that as shown in FIG. 11, the weldline W of the outermost layer was formed in the runner portion R.

Immediately thereafter, the pistons 82 and 84 shown in Stage 2 of FIG. 9B were actuated at the same frequency, but out of phase with each other by 180°. To the piston 82 was applied such a force as to inject GPPS 70 into the mould cavity and to the piston 84 was applied such a force that unsolidified HIPS 74 was pushed back out from the mould cavity. Each of the pistons 82 and 84 was actuated for 2 seconds and retained at that position for 1 second.

Subsequently the pistons 82 and 84 shown in Stage 3 of FIG. 9C were actuated at the same frequency, but out of phase with each other by 180°. To the piston 84 was applied such a force as to inject HIPS 74 into the mould cavity and to the piston 82 was applied a force that unsolidified GPPS 70 was pushed back out from the mould cavity. Each of the pistons 82 and 84 was actuated for 2 seconds and retained in that position for 3 seconds.

Further, the pistons 82 and 84 shown in Stage 4 of FIG. 9D were actuated in the same cycle at a phase difference of 180°. To the piston 82 was applied such a force as to fill GPPS 70 into the mould cavity and to the piston 84 was applied such a force that unsolidified HIPS 74 was pushed back out from the mould cavity. Each of the pistons 82 and 84 was actuated for 2 seconds and retained in that position for 2 seconds.

The flexural properties of the moulded article were determined by 3-point flexural testing at room temperature (23° C.) at a cross-head speed of 3 mm/min.

The tensile properties of the moulded article were determined by carrying out a tensile testing at room temperature (23° C.) at a cross-head speed of 5 mm/min.

In the impact test, a test specimen in the form of a ribbon was cut from the moulded article and subjected to a notching machine to make a type A notch of the ISO specification (ISO 180) on the test specimen, and this notched test specimen was used. The impact test was conducted using an Izod impact, tester at room temperature (23° C.).

The results of the flexural test and tensile test are given in Table 2.

Figure 14A:
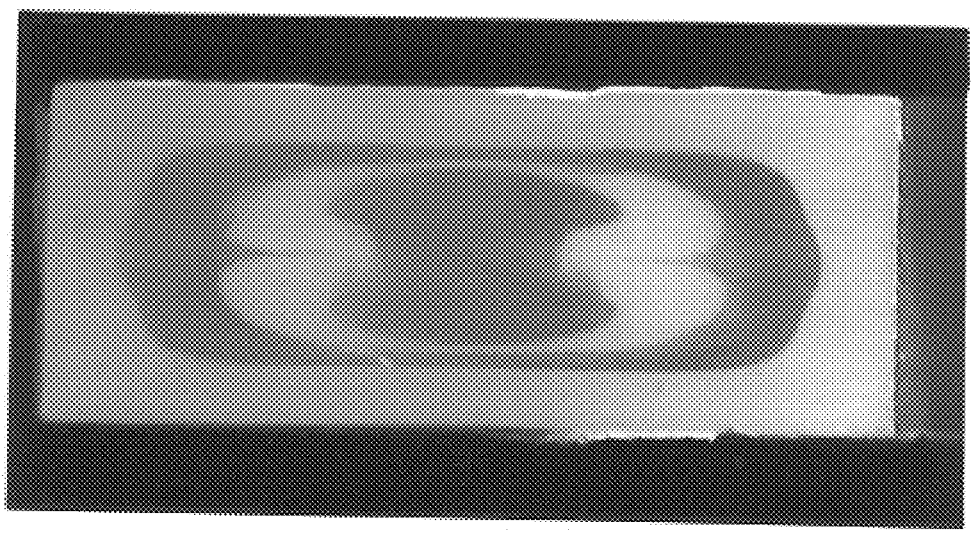
FIGS. 14A to 14B show the results of observations by means of an optical microscope of the cross-sections of moulded articles prepared in Examples 4 and 5 described hereinafter.

Also, the results of microscopic observation of the cross-section of the moulded article are shown in FIG. 14A.

EXAMPLE 5

In this Example, a high frequency induction heating and shear force control devices were mounted on the same injection moulding apparatus as in Example 2, and moulding was effected according to the same procedure as shown in FIGS. 10A to 10D.

As the injection moulding machine, a moulding machine having two injection barrels was used, and to one of the barrels was fed a general purpose polystyrene (GPPS) 70 from a hopper and to the other barrel was fed high impact polystyrene (HIPS) 74 from another hopper, and the resins were subjected to injection moulding. The mould used was a mould made of steel and the shape of the moulded article was a bar of 4 mm in thickness and 10 mm in width based on the ISO specification (ISO 524). Into a mould set at a temperature of 20° C. by general temperature regulator using refrigerant water was inserted an inductor for high-frequency induction heating in the position shown in Stage 1 of FIG. 10A, and oscillated at a frequency of 20 kHz at a powder output of 15 kW for 5 seconds. When a high frequency was generated, the distance between the inductor and the fixed mould surface and the distance between the inductor and the moving mould surface were both 8 mm.

The temperatures of the injection barrels were adjusted so as to obtain a resin mixture temperature of 210° C. Each of the resins was heated and plasticized in the cylinder and subsequently the molten materials of the resins were successively injected into a mould cavity through the respective manifolds (similar to as shown in FIG. 9A) under such conditions that in the case of GPPS 70, the injection pressure was 100 bar and the injection speed was set at a value of 20% of the capability of the injection moulding machine while in the case of HIPS 74, the injection pressure was 100 bar and the injection speed was set at a value of 80% of the capability of the injection moulding machine. By the above setting, the moulding was conducted so that as shown in FIG. 11, the weldline W of the outermost layer was formed in the runner portion R of the moulded article.

Immediately thereafter, the pistons 82 and 84 shown in Stage 3 of FIG. 10B were actuated at the same frequency, but out of phase with each other by 180°. To the piston 82 was applied such a force as to inject GPPS 70 into the mould cavity and to the piston 84 was applied such a force that unsolidified HIPS 74 was pushed back out from the mould cavity. Each of the pistons 82 and 84 was actuated for 2 seconds and retained at that position for 3 seconds.

Further, as shown in FIG. 10C the pistons 82 and 84 were actuated at the same frequency, but out of phase with each other by 180°. To the piston 84 was applied such a force as to inject HIPS 74 into the mould cavity and to the piston 82 was applied such a negative force that unsolidified GPPS 70 was pushed back out from the mould cavity. Each of the pistons 82 and 84 was actuated for 2 seconds and retained in that position for 3 seconds.

Subsequently, as shown in FIG. 10D the pistons 82 and 84 were actuated at the same frequency, but out of phase with each other by 180°. To the piston 82 was applied such a force as to inject GPPS 70 into the mould cavity and to the piston 84 was applied such a force that, unsolidified HIPS 74 was pushed back out from the mould cavity. Each of the pistons 82 and 84 was actuated for 2 seconds and retained in that position for 2 seconds.

The flexural properties of the moulded article were determined by 3-point flexural testing at room temperature (23° C.) at a cross-head speed of 3 mm/min.

The tensile properties of the moulded article were determined by carrying out a tensile testing at room temperature (23° C.) at a cross head speed of 5 mm/min.

In the impact test, a test specimen in the form of a ribbon was cut from the moulded article and subjected to a notching machine to make a type A notch of the ISO specification (ISO 180) on the test specimen, and this notched test specimen was used. The impact test was conducted using an Izod impact tester at room temperature (23° C.).

The results of the flexural test and tensile test are shown in Table 2.

Figure 14B:
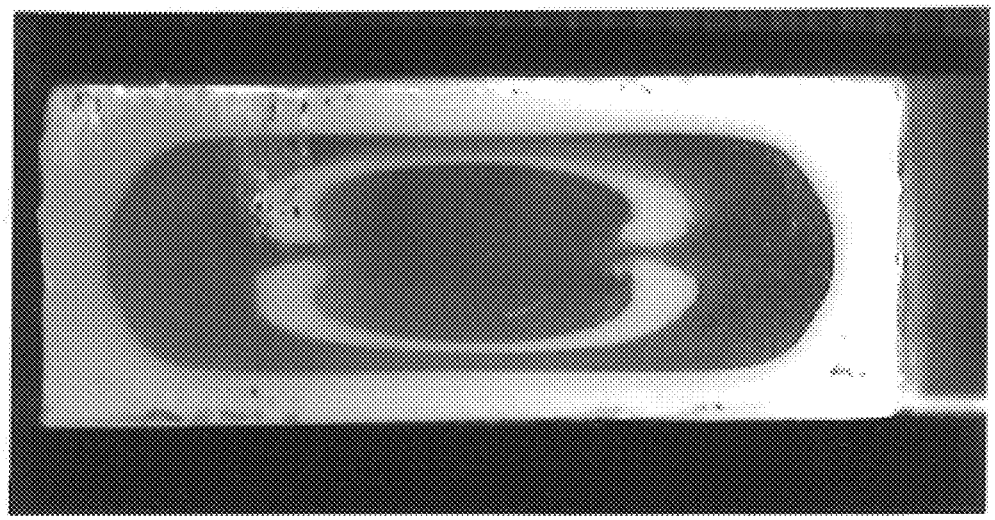

Also, the results of microscopic observation of the cross-section of the moulded article are shown in FIG. 14B.
Reference 3

For comparison with Examples 4 and 5, a moulded article of GPPS 70 and a moulded article of HIPS 74 were prepared in the manner stated below.

In the moulding of the comparative moulded articles, a conventional injection moulding machine having one cylinder was used to prepare moulded articles of the same ISO specification as in Examples 4 and 5.

The moulding conditions for GPPS 70 and HIPS 74 were as follows:

(a) Conventional Mouldings of HIPS 74
   Resin temperature: 210° C.
   Mould temperature: 20° C.
   Cooling time: 20 sec
   Injection pressure: 100 bar
   Holding pressure: 40 bar
(b) Conventional Mouldings of GPPS 70
   Resin temperature: 210° C.
   Mould temperature: 20° C.
   Cooling time: 20 sec
   Injection pressure: 100 bar
   Holding pressure: 40 bar The evaluation of mechanical properties was effected using the same method and apparatus as in Examples 4 and 5. The results of the evaluation of mechanical properties are shown in Table 2.

TABLE 2

| Moulding process | Example 4 | Example 5 | Reference 3 GPPS | HDPE |
|---|---|---|---|---|
| Flexural modulus (GPa) | 2.84 | 2.85 | 3.16 | 2.75 |
| Flexural strength (GPa) | 91.4 | 92.8 | 100 | 83.4 |
| Tensile strength (Mpa) | 54.0 | 55.5 | 51.9 | 41.9 |
| Impact strength (J/mm2) | 9.54 | 8.16 | 2.30 | 6.14 |
| Cross-sectional shape | 4 layers | 4 layers | 1 layer | 1 layer |
| Observation of cross-section | Figure 14A | Figure 14B | — | — |

In Examples 4 and 5, the flexural modulus was a value between the modulus of elasticity of GPPS 70 and the modulus of elasticity of HIPS 74 and the flexural strength was a value between the strength of GPPS 70 and the strength of HIPS 74. However, the tensile strength was larger than the values of both GPPS 70 and HIPS 74. From this fact, it can be seen that the preferred process can control the orientation of the resin in each layer to increase the tensile strength.

The impact strengths of the multilayer moulded articles in Examples 4 and 5 were 1.5 times the strength of HIPS 74.

This is because impact energy is absorbed at the layer interface of the layer structure and is one of the great benefits of the multilayering.

From the observation of the cross-section in Example 5 as shown in FIGS. 14A and 14B, it can be seen that even when the multilayer structure is not in the ring shape, the functions are manifested. That is to say, the preferred moulded article may be such that the internal structure is not the continuous layer structure and may be such that the multilayer is formed in the direction of flow of the materials and the desired characteristics are manifested.

It can be seen from the above results that the mulitlayer moulded article composed of GPPS 70 and HIPS 74 is a moulded article having well-balanced physical properties, and moulded articles having the desired physical properties can be easily prepared using inexpensive materials. Also, even when the materials are highly compatible with one another, the use of the preferred process enables the production of a multilayer moulded article.

EXAMPLE 6

In this Example, moulding was conducted using a two barrel injection moulding machine. The injection moulding machine is a moulding machine having two injection cylinders. To one of the cylinders was fed a general purpose polystyrene (GPPS) 70 from a hopper and to the other cylinder was fed an olefinic thermoplastic elastomer (TPO) from another hopper and the two were rejection moulded.

Figure 15A:
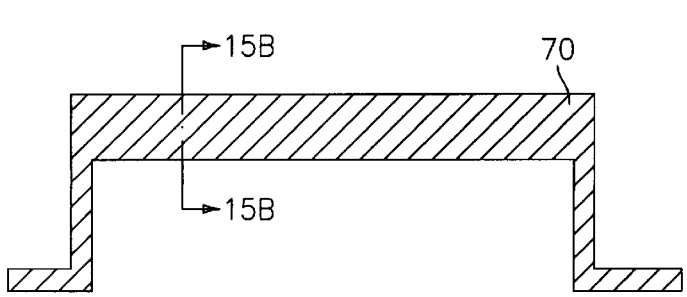
FIG. 15A is a schematic diagram of a moulded article prepared in Example 6 described hereinafter.
Figure 15B:
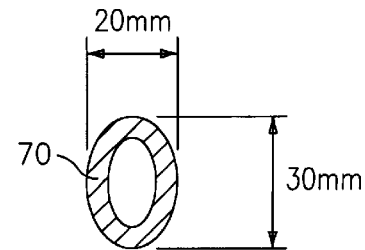
FIG. 15B is a view showing the cross-section at the A–A' line of the moulded article of FIG. 15A.

The shape of the moulded article was a thick wall moulded article as shown in FIGS. 15A and 15B and had a shape having runners and sprues at both ends of the moulded article in which the sprues were connected to separate sprue bushes. The sprue bushes were connected to the two barrels of the two-colour injection moulding machine through separate nozzle bushes. The mould was set at a temperature of 40° C. by a general temperature regulator using refrigerant water.

The temperatures of the injection barrels were adjusted so as to obtain a resin mixture temperature of 210° C. Each of the resins was heated and plasticised in the cylinder and subsequently the molten materials of the resins were injected into the mould cavity through the respective sprues and runners under the conditions used for GPPS 70, the injection pressure was 100 bar and the injection speed was set at a value of 80% of the capability of the injection moulding machine while in the case of TPO, the injection pressure was 100 bar and the injection speed was set at a value of 25% of the capability of the injection moulding machine. By use of the above setting, as shown in FIGS. 9A to 9D, moulding was conducted so that the weldline of the outermost layer was formed in the runner portion of the moulded article.

Subsequently, the holding pressure was set at a value of 75% of the maximum setting value of the moulding machine so that TPO was injected into the mould cavity, and the filling was effected for 6 seconds. Simultaneously therewith, the cylinder in which GPPS 70 was plasticised was pushed back by 30 mm due to the back flow of the molten GPPS 70 from the mould cavity.

Furthermore, a holding pressure of 10% was applied for 10 seconds so that positive hold pressure was applied to both the resins.

The moulded article was taken out of the mould and allowed to stand in the air, thereby cooling the core material TPO. Thereafter, TPO was mechanically drawn out to obtain a hollow moulded article of GPPS 70.

This moulded article had a smooth internal surface in the hollow portion and was free from sink marks, failure of surface appearance and the like.

What is claimed is:

1. A process of forming a multi-layered moulded article having a core and comprising at least two materials whereby melts of each material, contained and fed from separate reservoirs, are successively injected into a mould cavity having a surface and portions of said injected materials allowed to solidify so as to form a multi-layered moulded article, wherein said process comprises:

a) injecting a first molten material into said mould cavity from a first inlet port;

b) solidifying a portion of said first molten material in closest proximity to said mould cavity surface to a predetermined thickness to form a first layer;

c) replacing a remaining unsolidified portion of said first molten material with a second molten material by injecting said second molten material into said mould cavity from a second remote or opposed inlet port thereby pushing said remaining unsolidified portion of said first molten material out through said first inlet port;

d) solidifying a portion of said second molten material in closest proximity to said mould cavity surface to a predetermined thickness to form a second layer; and, optionally, e) forming additional successive layers by replacing remaining unsolidified portions of previously injected molten materials within said mould cavity with any remaining molten materials by injecting said remaining molten materials alternatively with or in place of said first and/or said second molten material into said mould cavity.

2. The process of claim 1, wherein after said first or said second layer is formed, a molten material is injected into said mould cavity, whereby a remaining unsolidified portion of a previously injected molten material is pushed back against its feeding direction.

3. The process of claim 2, wherein a force sufficient to push said remaining unsolidified portion of said previously injected molten material out of said mould cavity is applied.

4. The process of claim 1, wherein step e) comprises forming additional successive layers by replacing remaining unsolidified portions of previously injected molten materials within said mould cavity with two materials by injecting said materials alternatively with said second molten material to produce said multi-layered moulded article.

5. The process of claim 1, wherein said solidifying steps each further comprise temporarily retaining said injected molten material in said mould cavity.

6. The process of claim 1, wherein said process further comprises subjecting each molten material to a shear force by applying periodic forces to each of a plurality of regions of each said molten material, wherein said periodic forces, at a defined frequency, are alternatively applied to each region, whereby each region of molten material substantially moves at said defined frequency but out of phase with each other by 180°.

7. The process of claim 1, wherein at least two means for applying a force(s) to said molten materials is provided wherein at least one of said means is provided near an inlet port.

8. The process of claim 7 wherein said injecting steps each further comprise applying a force for injecting said molten material into said mould cavity, wherein said replacing steps each further comprise applying a force for pushing said remaining unsolidified portions of said molten material out from said mould cavity, and wherein said forces are applied by a reciprocating piston mechanism actuated in a chamber commmunicated with a conduit connected to said mould cavity.

9. The process of claim 1, wherein said mould cavity is rapidly heated prior to injecting said molten materials.

10. The process of claim 9, wherein said mould cavity is rapidly heated by high-frequency induction heating.

11. The process of claim 1, wherein said surface of said mould cavity or a part of said surface of said mould cavity is rapidly heated prior to injecting said molten materials.

12. The process of claim 1, wherein said molten material (s) contains a polymer material.

13. The process of claim 12, wherein said polymer material is a thermoplastic resin.

14. The process of claim 12, wherein said polymer material is a thermosetting resin.

15. The process of claim 1, wherein said multi-layered moulded article is a hollow moulded article, wherein said process further comprises: removing from said core at least one layer of said multi-layered moulded article.

* * * * *

UNITED STATES PATENT AND TRADEMARK OFFICE
CERTIFICATE OF CORRECTION

PATENT NO. : 6,120,714
DATED : September 19, 2000
INVENTOR(S) : Peter Stewart Allan; Michael John Bevis; and Kazuharu Yasuda It is certified that error appears in the above-identified patent and that said Letters Patent is hereby corrected as shown below:

Title page,
In the Assignee section, please insert --Asahi Kasei Kogyo Kabushiki Kaisha, Osaka, Japan-- after "Brunel University of Uxbridge, Middlesex, United Kingdom."

Signed and Sealed this

Twenty-fourth Day of April, 2001

Attest:

NICHOLAS P. GODICI

Attesting Officer     *Acting Director of the United States Patent and Trademark Office*

UNITED STATES PATENT AND TRADEMARK OFFICE
CERTIFICATE OF CORRECTION

PATENT NO.    : 6,120,714
DATED         : September 19, 2000
INVENTOR(S)   : Peter Stewart Allen; Michael John Bevis; and Kazuharu Yasuda It is certified that error appears in the above-identified patent and that said Letters Patent is hereby corrected as shown below:

In the Assignment section, please insert --Asahi Kasei Kogyo Kabushiki Kaisha, Osaka, Japan-- after "Brunel University of Uxbridge, Middlesex, United Kingdom."

Signed and Sealed this

Twenty-eighth Day of August, 2001

Attest:

*Nicholas P. Godici*

NICHOLAS P. GODICI
*Attesting Officer*         *Acting Director of the United States Patent and Trademark Office*